(12) United States Patent
Miura et al.

(10) Patent No.: US 10,396,344 B2
(45) Date of Patent: Aug. 27, 2019

(54) DRYING METHOD AND BATTERY MANUFACTURING METHOD

(71) Applicant: TOYOTA JIDOSHA KABUSHIKI KAISHA, Toyota-shi, Aichi (JP)

(72) Inventors: Yuzo Miura, Toyota (JP); Kei Sato, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 788 days.

(21) Appl. No.: 14/903,816

(22) PCT Filed: May 26, 2014

(86) PCT No.: PCT/JP2014/002740
§ 371 (c)(1),
(2) Date: Jan. 8, 2016

(87) PCT Pub. No.: WO2015/004839
PCT Pub. Date: Jan. 15, 2015

(65) Prior Publication Data
US 2016/0156015 A1  Jun. 2, 2016

(30) Foreign Application Priority Data
Jul. 12, 2013  (JP) .................. 2013-146059

(51) Int. Cl.
*H01M 4/04*    (2006.01)
*F26B 21/00*   (2006.01)
(Continued)

(52) U.S. Cl.
CPC ........... *H01M 4/04* (2013.01); *H01M 4/0404* (2013.01); *B05D 3/0254* (2013.01); *B05D 3/04* (2013.01);
(Continued)

(58) Field of Classification Search
CPC ...... H01M 4/04; H01M 4/0404; H01M 4/139; H01M 2004/021; B05D 3/0254; B05D 3/04; B05D 3/0466; F26B 21/00
(Continued)

(56) References Cited

U.S. PATENT DOCUMENTS 4,359,826 A * 11/1982 Rounsley .................. D21F 5/00
                                                    219/775
5,775,002 A *  7/1998 Iwase ..................... F26B 13/104
                                                     29/2
(Continued)

FOREIGN PATENT DOCUMENTS

CN          1383222 A     12/2002
JP        10-149815 A      6/1998
(Continued)

*Primary Examiner* — Brian K Talbot
(74) *Attorney, Agent, or Firm* — Sughrue Mion, PLLC

(57) ABSTRACT

An object of the invention is to provide a drying method, a drying device, and a battery manufacturing method which are capable of rapid drying. A drying method according to an embodiment of the invention dries an electrode layer (12) including a binder and a solvent. The drying method according to the embodiment includes a first step of blowing a gas onto a first area (22) of the electrode layer (12) to volatilize the solvent, the electrode layer (12) being coated on a current collector foil (11); and a second step of blowing a gas onto a second area (22) of the electrode layer (12) to volatilize the solvent, the second area (22) being located around the first area (21).

11 Claims, 18 Drawing Sheets

(51) Int. Cl.
*B05D 3/02* (2006.01)
*B05D 3/04* (2006.01)
*H01M 4/139* (2010.01)
*H01M 4/02* (2006.01)

(52) U.S. Cl.
CPC ............ *B05D 3/0466* (2013.01); *F26B 21/00* (2013.01); *H01M 4/139* (2013.01); *H01M 2004/021* (2013.01)

(58) Field of Classification Search
USPC .................................. 427/58, 115, 372.2, 379
See application file for complete search history.

(56) References Cited

U.S. PATENT DOCUMENTS

| | | | |
|---|---|---|---|
| 2001/0044045 A1 | 11/2001 | Sato et al. | |
| 2009/0117263 A1* | 5/2009 | Kaido | H01M 4/8828 427/115 |
| 2011/0244144 A1 | 10/2011 | Uchida | |
| 2012/0285036 A1* | 11/2012 | Matsuyama | H01M 4/139 34/406 |
| 2012/0295037 A1 | 11/2012 | Hagiwara et al. | |
| 2013/0305556 A1* | 11/2013 | Park | F26B 13/107 34/236 |
| 2015/0255780 A1* | 9/2015 | Tsuchiya | F26B 13/10 427/58 |

FOREIGN PATENT DOCUMENTS

| | | | |
|---|---|---|---|
| JP | 2001-307716 A | 11/2001 | |
| JP | 2006-54096 A | 2/2006 | |
| JP | 2009-266660 A | 11/2009 | |
| JP | 2009-289623 A | 12/2009 | |
| JP | 2012-028164 A | 2/2012 | |
| JP | 2012-243473 A | 12/2012 | |
| JP | 5348244 B2 | 11/2013 | |
| JP | 2014001914 | * 1/2014 | ............. F26B 21/00 |
| KR | 101467640 | * 12/2014 | ............. F26B 21/00 |

* cited by examiner

DRYING METHOD AND BATTERY MANUFACTURING METHOD

CROSS REFERENCE TO RELATED APPLICATIONS

This is a National Stage of International Application No. PCT/JP2014/002740 filed May 26, 2014, claiming priority based on Japanese Patent Application No. 2013-146059 filed Jul. 12, 2013, the contents of all of which are incorporated herein by reference in their entirety.

TECHNICAL FIELD

The present invention relates to a drying device, a drying method, and a battery manufacturing method.

BACKGROUND ART

Patent Literature 1 discloses a drying device that dries a paste coated on a core material of an electrode plate in the process of manufacturing a battery electrode plate of a secondary battery. In the drying device disclosed in Patent Literature 1, dry air is blown toward the battery electrode plate from a nozzle chamber while the battery electrode plate is being wound around a drum. Further, the nozzle chamber includes rows of slit nozzles which can independently control the temperature, wind velocity, and wind direction of hot air.

CITATION LIST

Patent Literature

[Patent Literature 1] Japanese Unexamined Patent Application Publication No. H10-149815

SUMMARY OF INVENTION

Technical Problem

In terms of productivity, it is preferable to rapidly dry the paste to volatilize a solvent in the above-described drying device. However, rapid volatilization of the solvent results in a non-uniform binder concentration. This causes segregation of a binder on the surface of the electrode plate. For example, when the volatilization rate of the solvent is higher than the diffusion rate of the binder, the binder concentration at the surface of the electrode plate increases. Accordingly, the drying device disclosed in Patent Literature 1 has a problem that it is difficult to achieve rapid drying.

The present invention has been made in view of the above-mentioned problem, and an object of the present invention is to provide a drying device, a drying method, and a battery manufacturing method which are capable of rapid drying.

Solution to Problem

A drying method according to an aspect of the present invention is a drying method that dries an electrode layer including a binder and a solvent, the drying method including: a first step of blowing a gas onto a first area of the electrode layer to volatilize the solvent, the electrode layer being coated on a base material; and a second step of blowing a gas onto a second area of the electrode layer to volatilize the solvent, the second area being located around the first area. This drying method is capable of rapid drying.

In the above-described drying method, in the first step, the solvent may be volatilized so that a concentration of the binder in the first area is higher than a concentration of the binder in the second area on a surface of the electrode layer, and in the second step, the solvent may be volatilized so that the concentration of the binder in the first area is lower than the concentration of the binder in the second area on the surface of the electrode layer. This leads to an increase in the number of directions in which the binder diffuses and an increase in concentration gradient, thereby achieving rapid drying.

In the above-described manufacturing method, the first area and the second area may be arranged in a staggered manner. This leads to an increase in the number of directions in which the binder diffuses, thereby achieving rapid drying.

In the above-described drying method, the first step and the second step may be performed alternately and repeatedly. This leads to an increase in the number of directions in which the binder diffuses, thereby achieving rapid drying.

In the above-described drying method, in the first step, the solvent may be volatilized by blowing a gas onto the first area without applying the gas to the second area, and in the second step, the solvent may be volatilized by blowing a gas onto the second area without applying the gas to the first area. This leads to an increase in the concentration gradient, thereby achieving rapid drying.

In the above-described drying method, in the first step, a gas may be blown toward the second area so that a volatilization rate of the solvent in the first area is higher than a volatilization rate of the solvent in the second area, and in the second step, a gas may be blown toward the first area so that the volatilization rate of the solvent in the second area is higher than the volatilization rate of the solvent in the first area. This leads to an increase in the number of directions in which the binder diffuses, thereby achieving rapid drying.

In the above-described drying method, in the first step, a gas to be blown toward the second area may have a temperature lower than that of a gas to be blown toward the first area, and in the second step, the gas to be blown toward the first area may have a temperature lower than that of the gas to be blown toward the second area. Thus, rapid drying can be easily achieved.

In the above-described drying method, in the first step, an air flow of a gas to be blown toward the second area may be smaller than an air flow of a gas to be blown toward the first area, and in the second step, the air flow of the gas to be blown toward the first area may be smaller than the air flow of the gas to be blown toward the second area. Thus, rapid drying can be easily achieved.

In the above-described drying method, in the first step, a gas may be blown toward the second area from the first area, and in the second step, a gas may be blown toward the first area from the second area. Thus, rapid drying can be easily achieved.

In the above-described drying method, in each of the first and second steps, a gas may be blown without moving a position of the electrode layer relative to an air outlet for the gas. Thus, rapid drying can be easily achieved.

In the above-described drying method, in each of the first and second steps, a gas may be blown while a position of the electrode layer relative to an air outlet for the gas is moved. Thus, rapid drying can be easily achieved.

A battery manufacturing method according to an embodiment of the present invention includes the steps of: coating an electrode layer on a base material, the electrode layer including a binder and a solvent; and drying the electrode layer by the above-described drying method. This leads to an improvement in productivity.

A drying device according to an embodiment of the present invention is a drying device that dries an electrode layer including a binder and a solvent, the drying device including generation means for generating a gas to dry the electrode layer. The drying device performs: a first step of blowing a gas onto a first area of the electrode layer to volatilize the solvent, the electrode layer being coated on a base material; and a second step of blowing a gas onto a second area of the electrode layer after the solvent is volatilized in the first step, the second area being located around the first area. Thus, rapid drying can be achieved.

In the above-described drying device, in the first step, the solvent may be volatilized so that a concentration of the binder in the first area is higher than a concentration of the binder in the second area on a surface of the electrode layer, and in the second step, the solvent may be volatilized so that the concentration of the binder in the first area is lower than the concentration of the binder in the second area on the surface of the electrode layer. This leads to an increase in the number of directions in which the binder diffuses and an increase in the concentration gradient, thereby achieving rapid drying.

In the above-described drying device, the first area and the second area may be arranged in a staggered manner. This leads to an increase in the number of directions in which the binder, thereby achieving rapid drying.

In the above-described drying device, the first step and the second step may be performed alternately and repeatedly. This leads to an increase in the number of directions in which the binder diffuses, thereby achieving rapid drying.

In the above-described drying device, in the first step, the solvent may be partially volatilized by blowing a gas onto the first area without applying the gas to the second area, and in the second step, the solvent may be partially volatilized by blowing a gas onto the second area without applying the gas to the first area. This leads to an increase in the concentration gradient of the binder, thereby achieving rapid drying.

The above-described drying device may include: a duct through which the gas is supplied from the generation means and blown toward the electrode layer; and a wind shield that partially blocks the gas being blown from an air outlet of the duct. Thus, rapid drying can be achieved with a simple structure.

In the above-described drying device, a position of the wind shield within the duct to be set in the first step may be different from a position of the wind shield within the duct to be set in the second step. Thus, rapid drying can be achieved with a simple structure.

In the above-described drying device, in the first step, a gas may be blown toward the second area so that a volatilization rate of the solvent in the first area is higher than a volatilization rate of the solvent in the second area, and in the second step, a gas may be blown toward the first area so that the volatilization rate of the solvent in the second area is higher than the volatilization rate of the solvent in the first area. This leads to an increase in the number of directions in which the binder diffuses, thereby achieving rapid drying.

The above-described drying device may include: a duct through which the gas is supplied; and a partition plate provided in the duct so as to make a distribution of an air flow of a gas blown from an air outlet of the duct non-uniform, the partition plate changing a direction of the gas flowing in the duct. Thus, rapid drying can be achieved with a simple structure.

In the above-described drying device, a direction of the partition plate within the duct to be set in the first step may be different from a direction of the partition plate within the duct to be set in the second step. Thus, rapid drying can be achieved with a simple structure.

The above-described drying device may include: a duct through which the gas is supplied; and a heater that is provided in a part of the duct so as to make a temperature distribution of a gas blown from an air outlet of the duct non-uniform. Thus, rapid drying can be achieved with a simple structure.

In the above-described drying device, a position of the heater within the duct to be set in the first step may be different from a position of the heater within the duct to be set in the second step. Thus, rapid drying can be achieved with a simple structure.

The above-described drying device may include: a first duct through which a gas is blown toward the first area; and a second duct through which a gas is blown toward the second area, at least one of a temperature and an air flow of the gas blown from the first duct being different from that of the gas blown from the second duct. Thus, rapid drying can be achieved with a simple structure.

In the above-described drying device, a position of the electrode layer relative to the air outlet in the first step may be different from a position of the electrode layer relative to the air outlet in the second step. Thus, rapid drying can be achieved with a simple structure.

In the above-described drying device, in the first step, a gas may be blown toward the second area from the first area, and in the second step, a gas may be blown toward the first area from the second area. Thus, rapid drying can be achieved with a simple structure.

In the above-described drying device, in each of the first and second steps, a gas may be blown without moving a position of the electrode layer relative to an air outlet for the gas. Thus, rapid drying can be achieved with a simple structure.

In the above-described drying device, in each of the first and second steps, a gas may be blown while a position of the electrode layer relative to an air outlet for the gas is moved. Thus, rapid drying can be achieved with a simple structure.

Advantageous Effects of Invention

According to the present invention, it is possible to provide a drying method, a drying device, and a battery manufacturing method which are capable of rapid drying.

DESCRIPTION OF EMBODIMENTS

Embodiments of a vehicle according to the present invention will be described in detail below with reference to the drawings. However, the present invention is not limited to the following embodiments. To clarify the explanation, the following description and the drawings are simplified as appropriate. Repeated explanation of components in the embodiments and modified examples thereof is omitted as appropriate.

First Embodiment (Principle of Drying Method)

The principle of a drying method according to this embodiment will be described. The drying method according to this embodiment is used in a process of, for example, manufacturing a secondary battery such as a lithium ion battery. Specifically, a drying device blows hot air onto an electrode layer coated on a base material. More specifically, in order to volatilize a solvent included in the electrode layer, dry gas is blown toward the surface of the base material on which the electrode layer is coated. The solvent is non-uniformly volatilized from the surface of the electrode layer. The solvent is non-uniformly volatilized from the surface of the electrode layer, thereby suppressing the segregation of binder. According, in this embodiment, hot air is blown toward a part of the electrode layer.

Figure 1:
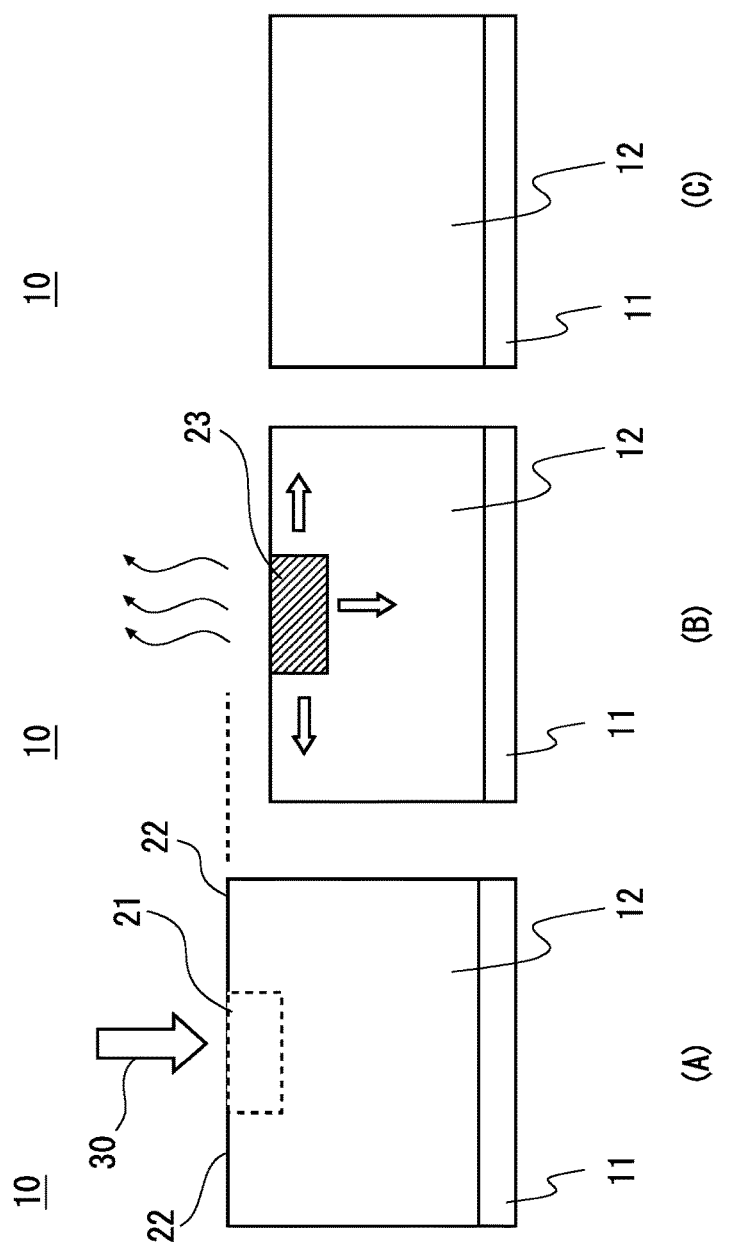
FIG. 1 is a sectional view showing a structure of an electrode in a drying process.

Referring first to FIG. 1, the principle of the drying method according to this embodiment will be described. FIG. 1 is a process cross-sectional view schematically showing a structure of an electrode 10 to be dried. First, as shown in A of FIG. 1, an electrode layer 12 is coated on a current collector foil 11. Specifically, the electrode 10, which is a positive electrode or a negative electrode, includes the current collector foil 11 and the electrode layer 12. The electrode layer 12 is coated on the current collector foil 11 which is a base material.

The electrode layer 12 includes an active material, a binder, and a solvent. The current collector foil 11 is a current collector and serves as a base material of the electrode 10. The current collector foil 11 is a conductive sheet material. For example, in the case of a positive electrode, Al foil is used, and in the case of a negative electrode, Cu foil is used. The active material is a particulate material for performing an oxidation-reduction reaction. For example, in the case of a positive electrode, lithium manganate, lithium cobalt oxide, or the like is used as the active material, and in the case of a negative electrode, a carbon material or the like is used as the active material. The current collector foil 11 and the active material are not limited to the above-mentioned materials. Appropriate materials are selected depending on which one of the positive electrode and the negative electrode is used.

The binder is provided to allow the active material and the like to adhere to the current collector foil 11. The electrode layer 12 may include other materials such as a conductive assistant. The electrode layer 12 also includes a solvent with an appropriate viscosity. Specifically, the electrode layer 12 includes a solvent at a predetermined ratio so that the solvent has a viscosity at which the electrode layer can be uniformly coated. The electrode layer 12 in which the binder, the solvent, and the like are included is coated on the current collector foil 11. Then hot air is blown toward the electrode layer 12 to volatilize the solvent, thereby completing the electrode 10. During the volatilization of the solvent, the binder included in the electrode layer 12 is diffused.

As shown in A of FIG. 1, in the drying process, hot air 30 is blown toward a part of the electrode layer 12. As shown in B of FIG. 1, the solvent is non-uniformly volatilized. For example, the hot air 30 is blown toward a first area 21 which is a part of the electrode layer 12. The hot air 30 is not blown toward a second area 22 which is the remaining portion of the electrode layer 12. In other words, the hot air 30 is not blown toward the second area 22 around the first area 21. In this case, the first area 21 is a central portion in the plane of the electrode layer 12 and the second area 22 is a peripheral portion of the first area 21. However, the arrangement of the first area 21 and the second area 22 is not particularly limited.

With this structure, the solvent included in the electrode layer 12 is non-uniformly volatilized. That is, the solvent is gradually volatilized from the first area 21, and the state as shown in B of FIG. 1 is obtained. Due to the volatilization of the solvent, the thickness of the electrode layer 12 in the state shown in B of FIG. 1 is smaller than the thickness of the electrode layer 12 in the state shown in A of FIG. 1.

In the vicinity of the surface of the electrode layer 12, the portion corresponding to the first area 21 becomes a high-concentration area 23 in which the binder concentration is high. In other words, the volatilization of the solvent does not proceed in the second area 22, while the solvent is gradually volatilized from the first area 21. Thus, partial volatilization of the solvent can make the concentration distribution of the binder non-uniform in the vicinity of the surface of the electrode layer 12. That is, the binder concentration is high in the first area 21 in which the volatilization of the solvent proceeds. Accordingly, the binder concentration in the first area 21 is higher than the binder concentration in the second area 22. When the binder concentration in the first area 21 is higher than that in the peripheral area, the binder diffuses not only in the thickness direction, but also in the lateral direction (direction perpendicular to the thickness direction). Thus, the number of directions in which the binder diffuses increases and the concentration gradient increases, so that the diffusion rate becomes higher than the volatilization rate. Consequently, rapid drying can be achieved. Accordingly, as shown in the state shown in C of FIG. 1, the binder concentration is uniform even when the electrode layer is rapidly dried.

Figure 2:
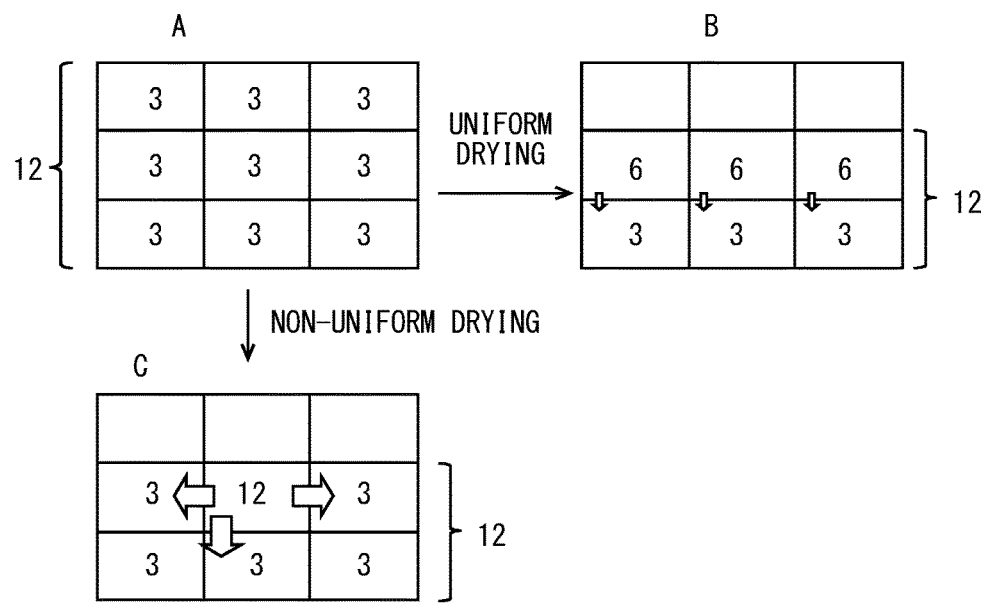
FIG. 2 is a diagram for explaining a change in binder concentration in an electrode layer.

The difference between the diffusion rate when the solvent is non-uniformly volatilized and the diffusion rate when the solvent is uniformly volatilized will now be described with reference to FIG. 2. FIG. 2 is a diagram showing the concentration distribution of the binder in a simplified manner. For clarity of explanation, it is assumed herein that the area is divided into three cells in each of the lateral direction and the longitudinal direction (thickness direction). FIG. 2 illustrates that numerical values in the nine cells each represent a binder concentration. In the following description, the uppermost row is referred to as a first row; the lowermost row is referred to as a third row; and the row between the first row and the third row is referred to as a second row. Note that the upper side of FIG. 2 corresponds to the surface of the electrode layer 12 and the lower side of FIG. 2 corresponds to the side of the electrode layer on which the current collector foil 11 is located.

First, uniform drying according to a comparative example will be described. Since the binder concentration is uniform before the drying process, the binder concentration in each cell is "3" (A in FIG. 2). Hot air is blown toward the entire electrode layer 12 to uniformly dry the electrode layer. Then, the solvent is volatilized and the thickness of the electrode layer 12 decreases (B in FIG. 2). The solvent in the first row is volatilized, and the second row from the top becomes the surface of the electrode layer 12. When the entire surface of the electrode layer is uniformly dried, there is no difference in the binder concentration in the lateral direction. Accordingly, the binder diffuses downward (in the thickness direction). In other words, along with the volatilization of the solvent, the binder in the first row diffuses into the second row. Therefore, at the stage where the solvent in the first row is volatilized, the binder concentration in the surface of the electrode layer 12, i.e., the binder concentration in the second row, is "6" and uniform, and the binder concentration in the third row is "3". Accordingly, the difference between the concentrations in the thickness direction is "3". The binder diffuses downward with a concentration difference of "3".

On the other hand, in this embodiment, hot air is blown toward a part of the electrode layer 12 to non-uniformly dry the electrode layer. Then, the solvent is volatilized from the portion to which the hot air is blown. In this case, assume that the hot air is blown toward the cell located at the center in the lateral direction, and the hot air is not blown toward the cells located on the right and left sides of the central cell. When the solvent is non-uniformly volatilized, a binder concentration difference occurs in the lateral direction. The binder concentration only in the area to which the hot air is blown in the surface of the electrode 10, i.e., in the second row from the top, increases, so that a concentration difference is generated between the binder concentration in the area to which the hot air is blown and the binder concentration in the peripheral area (FIG. 2C). In this case, the binder concentration in the cell to which the hot air is blown is "12", and the binder concentration in the other cells is "3". The binder in the first row moves toward the central cell in the second row. Accordingly, the binder concentration in the central cell in the second row increases. Thus, a difference between the binder concentrations in the lateral direction occurs in the second row.

In this state, the difference between the binder concentration in the central cell in the second row and the binder concentration in the cell below the central cell in the second row is "9". The difference between the binder concentration in the central cell in the second row and the binder concentration in the cells located on the right and left sides of the central cell in the second row is also "9". Thus, the binder diffuses in three directions, i.e., downward, leftward, and rightward, with a concentration difference of "9". In addition, the binder which has diffused in the right-left direction further diffuses downward. In this manner, when the electrode layer 12 is non-uniformly dried, the concentration difference is large, and thus the diffusion rate is high. In addition, since the binder diffuses also in the lateral direction, the number of directions in which the binder diffuses increases. This allows the binder to diffuse more rapidly.

Figure 3:
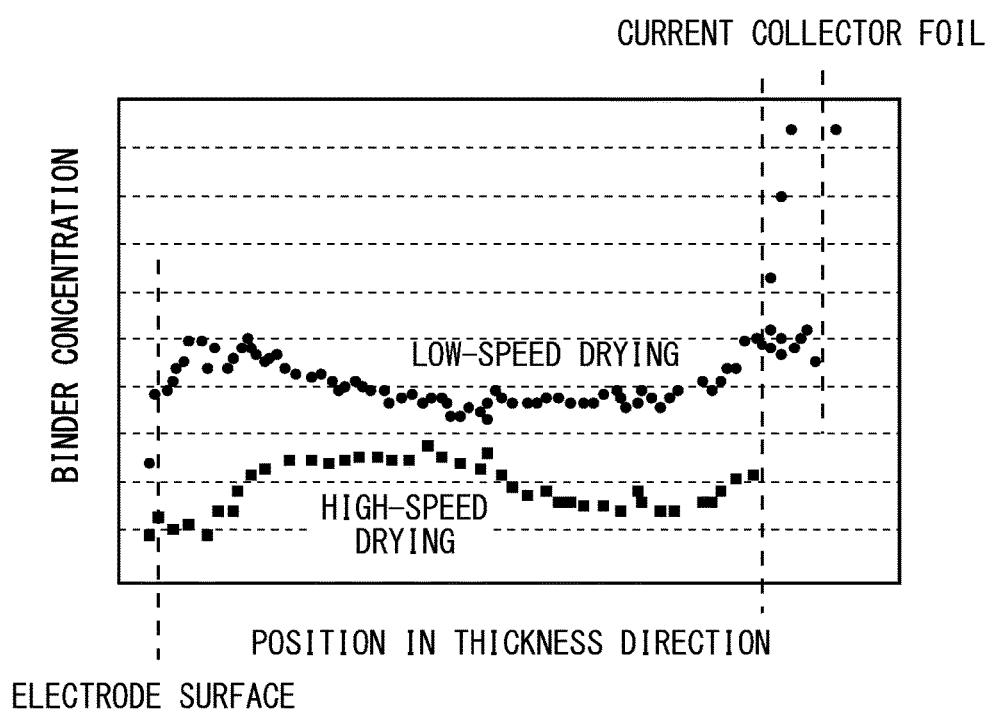
FIG. 3 is a graph showing the binder concentration in the thickness direction of the electrode layer.

In this manner, when hot air is blown toward only a part of the electrode layer 12 to volatilize the solvent, the binder diffuses in the lateral direction. FIG. 3 shows results of measuring the binder concentration when the hot air is blown toward only a part of the electrode layer. FIG. 3 is a graph showing a distribution of binder concentrations in the thickness direction. The horizontal axis represents a position in the thickness direction, and the vertical axis represents a binder concentration. In the horizontal axis shown in FIG. 3, the left side corresponds to the surface of the electrode and the right side corresponds to the side of the electrode on which the current collector foil 11 is located. The binder concentration is measured by glow-discharge mass spectrometry (GD-MS) using VG-9000 manufactured by V. G. Scientific. FIG. 3 shows the binder concentration in the portion to which the hot air is blown.

FIG. 3 shows measurement results when rapid drying using high-temperature hot air and low-speed drying using low-temperature hot air are performed. When the hot air is applied only to a part of the electrode layer 12 to dry the electrode layer, the binder concentration during high-speed drying is lower than the binder concentration during low-speed drying. Accordingly, when the drying rate is high, drying proceeds while the binder is pushed away in the lateral direction. Thus, it is estimated that the whole binder concentration is lowered. In other words, since it is apparent that the binder diffuses in the lateral direction, it can be inferred based on the finding that rapid drying can be achieved while the segregation of the binder is suppressed.

Figure 4:
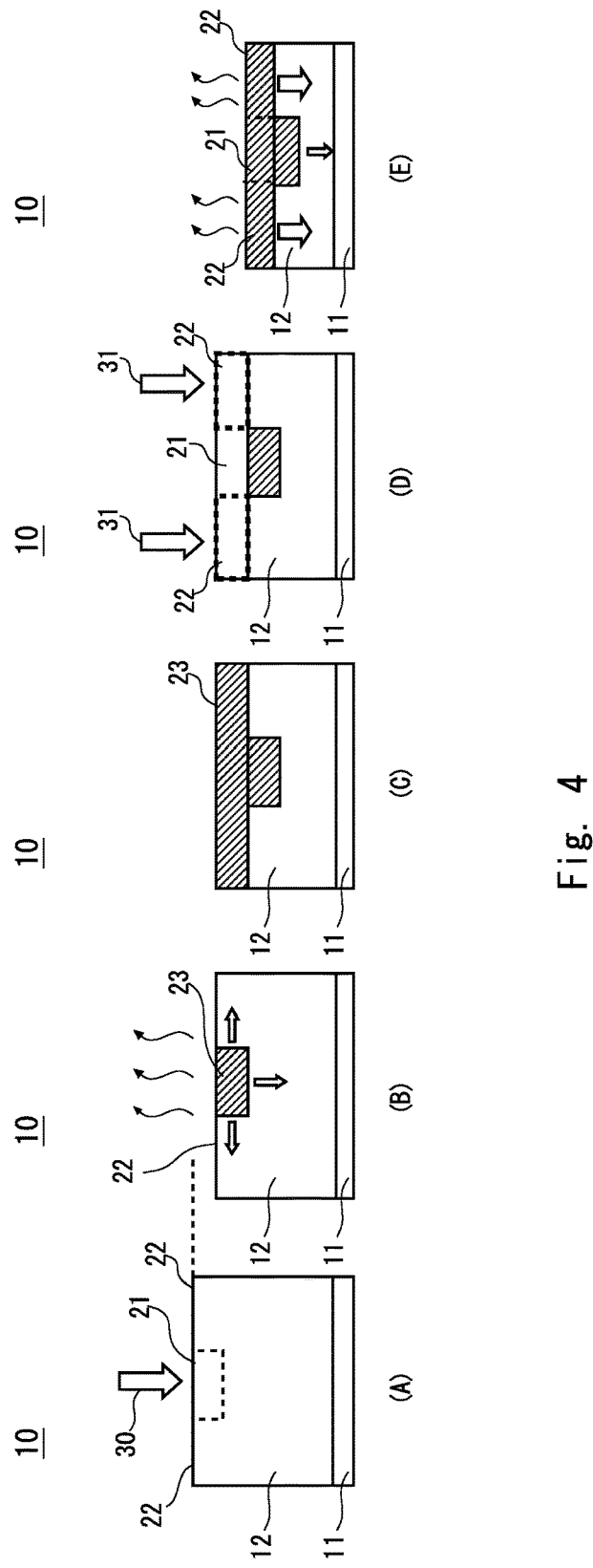
FIG. 4 is a sectional view showing the structure of the electrode in a two-step drying process.

The drying method using the diffusion of the binder in the lateral direction will be described with reference to FIG. 4. FIG. 4 is a process cross-sectional view schematically showing the structure of the electrode 10 in the drying process. First, as shown in A of FIG. 4, the hot air 30 is blown toward a part of the electrode layer 12 formed on the current collector foil 11. Specifically, as shown in A of FIG. 1, the hot air 30 is blown toward only the first area 21 without blowing the hot air 30 toward the second area 22. That is, the first area 21 is a dried region and the second area 22 is a non-dried region. The solvent is volatilized from the first area 21, and the thickness of the electrode layer 12 decreases as shown in B of FIG. 4. At this time, the first area 21 is the high-concentration area 23 in which the binder concentration is high. Accordingly, the binder diffuses in the lateral direction and the downward direction, like in the drying process described above with reference to FIG. 2.

Subsequently, the hot air is blown toward the first area 21 in the state where the hot air is not blown toward the second area 22. When the volatilization rate of the solvent is higher than the diffusion rate of the binder, the diffusion of the binder is slower than the volatilization of the solvent, so that a concentration distribution occurs as shown in C of FIG. 4. That is, the concentration of the binder is distributed and the high-concentration area 23 extends in the lateral direction and the downward direction.

Next, as shown in D of FIG. 4, the blowing of the hot air 30 toward the first area 21 is stopped, while hot air 31 is blown toward the second area 22. That is, the second area 22 is a dried region and the first area 21 is a non-dried region. Then, as shown in E of FIG. 4, the solvent is volatilized from the second area 22, and the thickness of the electrode layer 12 decreases.

In the second area 22, the concentration gradient of the binder in the thickness direction increases due to the volatilization of the solvent. In the second area 22, the binder is diffused downward due to the high concentration gradient. In other words, the diffusion of the binder proceeds in the downward direction in which the concentration gradient is high. Further, since the volatilization does not proceed in the first area 21, the concentration gradient in the first area 21 is lower than that in the second area 22. Accordingly, in the first area 21, the binder diffuses downward at a diffusion rate lower than that in the second area. In the vicinity of the surface of the electrode layer 12, only a small amount of binder moves in the lateral direction during the time when the concentration gradient in the lateral direction is low. That is, since the concentration gradient in the thickness direction is higher than the concentration gradient in the lateral direction, the amount of diffusion of the binder in the downward direction increases.

After the hot air 30 is blown toward the first area 21, the hot air 31 is blown toward the second area 22, thereby achieving rapid drying. That is, even when the volatilization rate is higher than the diffusion rate, the segregation of the binder can be prevented by drying the areas alternately. Thus, uniform rapid drying can be achieved.

(Drying Process)

Figure 5:
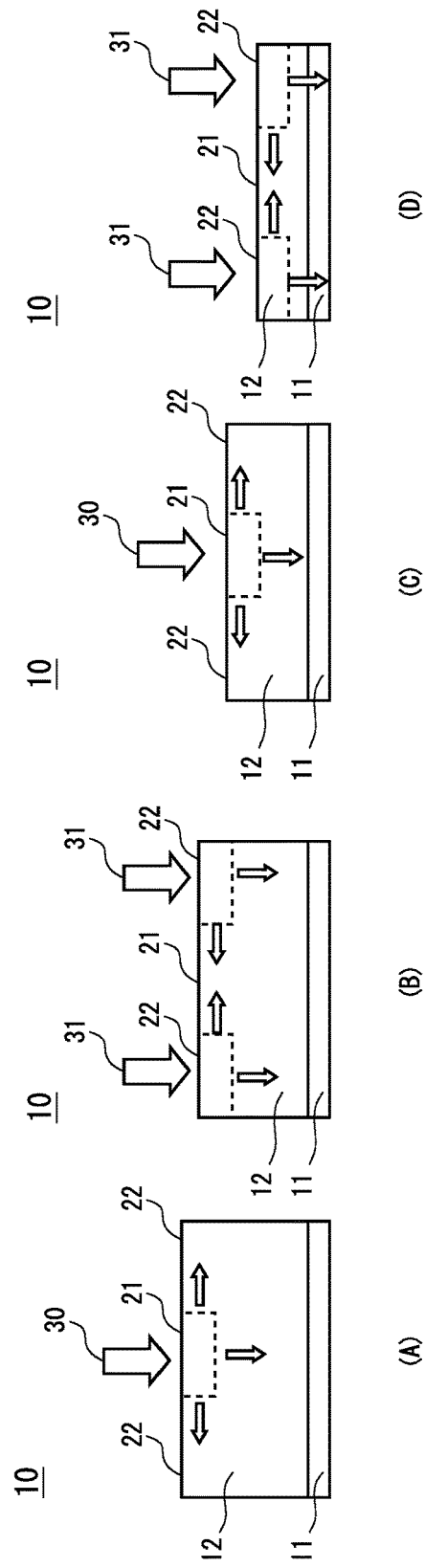
FIG. 5 is a process cross-sectional view for explaining a drying process according to a first embodiment.

The drying method according to this embodiment will be described with reference to FIG. 5. FIG. 5 is a process cross-sectional view showing the structure of the electrode 10 in the drying method according to this embodiment. First, the temperature and air flow of the hot air to be used for the drying device are determined. The area to be divided is then determined according to the size of the electrode 10. The first area 21 and the second area 22 for drying a part of the electrode layer 12 are determined. Thus, the electrode layer 12 is divided into two areas in a plan view.

As shown in A of FIG. 5, the hot air 30 is blown toward the first area 21 without blowing the hot air 30 toward the second area 22. The first area 21 is a dried region and the second area 22 is a non-dried region. As a result, the solvent is volatilized from the first area 21. In the vicinity of the surface of the electrode layer 12, the first area 21 becomes the high-concentration area in which the binder concentration is high. Accordingly, the diffusion of the binder proceeds in the downward direction and the lateral direction.

Next, as shown in B of FIG. 5, the hot air 31 is blown toward the second area 22 without blowing the hot air 31 toward the first area 21. The first area 21 is a non-dried region and the second area 22 is a dried region. In other words, the dried region is changed by changing the position where the hot air is blown, to thereby dry another region. As a result, the solvent is volatilized from the second area 22. The binder concentration in the second area 22 increases. The binder is rapidly diffused downward due to the high concentration gradient. Further, when a concentration gradient is generated in the plane of the electrode, the binder diffuses in the lateral direction.

Further, as shown in C of FIG. 5, the hot air 30 is blown toward the first area 21 without blowing the hot air 30 toward the second area 2. Specifically, the hot air 30 is blown toward the region to which the hot air 30 is blown in the process shown in A of FIG. 5. As a result, the solvent is volatilized in the first area 21. Accordingly, the first area 21 becomes the high-concentration area in which the binder concentration is high. The binder is rapidly diffused downward due to the high concentration gradient. Further, when a concentration gradient is generated in the plane of the electrode, the binder diffuses in the lateral direction.

After that, as shown in D of FIG. 5, the hot air 31 is blown toward the second area 22 without blowing the hot air 31 toward the first area 21. In other words, the dried region is changed by changing the position where the hot air is blown, to thereby dry another region. As a result, the solvent is volatilized from the second area 22. Accordingly, the binder concentration in the second area 22 increases. The binder is rapidly diffused downward due to the high concentration gradient. Further, when a concentration gradient is generated in the plane of the electrode, the binder diffuses in the lateral direction.

In this manner, after a first step of blowing the hot air toward the first area 21 is performed, a second step of blowing the hot air toward the second area 22 other than the first area 21 is performed. The first step and the second step are performed alternately and repeatedly. In other words, each of the first step and the second step is performed a plurality of times. This leads to an increase in the number of directions in which the binder diffuses, thereby achieving rapid drying.

For example, in each of the first step and the second step, a part of the electrode layer 12 is dried so that the binder diffuses in the right-left direction. Accordingly, the apparent diffusion rate can be increased, and thus rapid drying can be achieved. Even when high-temperature hot air or strong hot air is used, the binder diffuses with a high concentration gradient. The binder can be substantially diffused in the thickness direction rapidly. Therefore, the segregation of the binder can be suppressed and rapid drying can be achieved.

Thus, in the middle of the drying process, a part of the solvent is volatilized so as to make the concentration distribution of the binder in the plane of the electrode non-uniform. In the first step, the solvent is volatilized so that the binder concentration in the first area 21 is higher than the binder concentration in the second area 22 on the surface of the electrode layer 12. Specifically, the solvent is non-uniformly volatilized so that the binder concentration in the first area 21 is higher than the binder concentration in the second area 22 at the time when the first step is completed. In the second step, the solvent is volatilized so that the binder concentration in the first area 21 is lower than the binder concentration in the second area 22 on the surface of the electrode layer 12. Specifically, the solvent is non-uniformly volatilized so that the binder concentration in the second area 22 is higher than the binder concentration in the first area 21 at the time when the second step is completed. Thus, the concentration distribution of the binder in the plane of the electrode can be made non-uniform in the middle of the drying process, which leads to an increase in the drying rate.

Further, in the second step, it is preferable that the hot air be blown toward the entire area to which the hot air is not blown in the first step. In the case where the first step and the second step are performed alternately and repeatedly, the hot air need not necessarily be blown toward the same area in the first and second rounds of the first step. Specifically, in the second round of the first step, the hot air may be blown toward the area to which the hot air is not blown in the first round of the first step. Similarly, in the second round of the second step, the hot air may be blown toward the area to which the hot air is not blown in the first round of the second step. The time for blowing the hot air in the first step may be substantially the same as the time for blowing the hot air in the second step.

(Drying Device)

Figure 6:
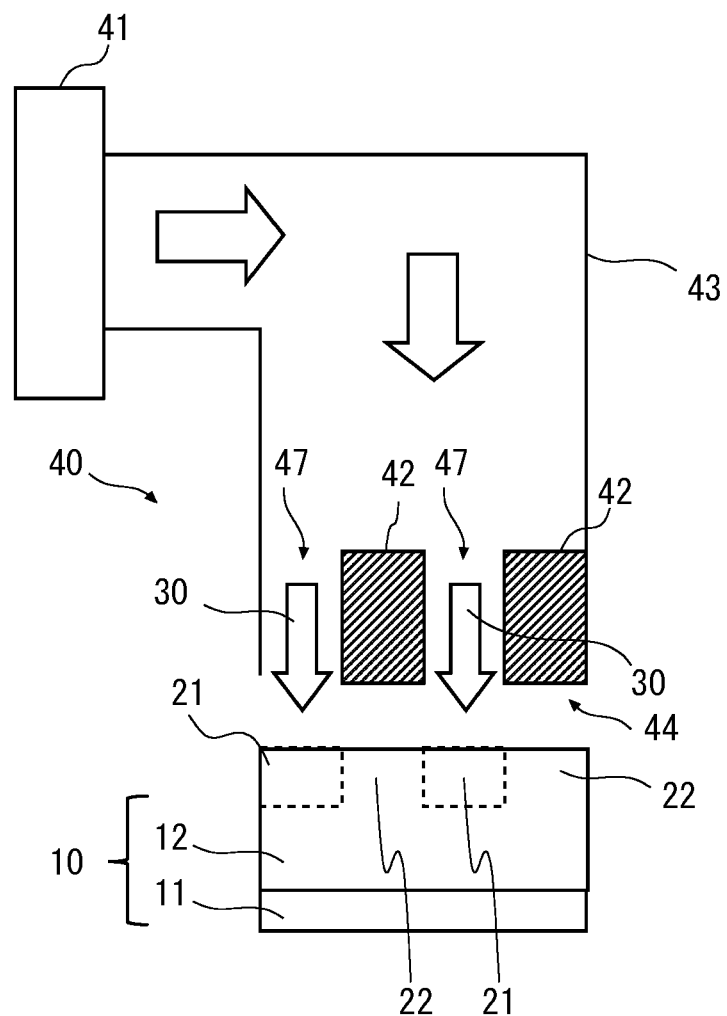
FIG. 6 is a diagram schematically showing a structure of a drying device in a first step.

An example of the structure of the drying device according to this embodiment will be described below. FIG. 6 is a diagram schematically showing an example of the structure of a drying device 40 that executes the drying method described above. The drying device 40 includes a hot air generator 41, and wind shields 42, and a duct 43.

The hot air generator 41 is generation means that includes a heater, a fan, a gas cylinder, and the like, and generates a high-temperature gas such as dry air or dry nitrogen. The duct 43 is attached to the hot air generator 41. The hot air generator 41 supplies a heated gas to the duct 43. The gas generated by the hot air generator 41 passes through the duct 43 and becomes hot air for drying the electrode layer 12. An air outlet 44 of the duct 43 is disposed immediately above the electrode layer 12. Specifically, the air outlet 44 is disposed so as to be opposed to the surface of the electrode 10. Accordingly, the hot air 30 blown from the air outlet 44 of the duct 43 is applied to the electrode layer 12. The hot air 30 is blown in a direction perpendicular to the surface of the electrode 10, thereby drying the electrode layer 12.

The air outlet 44 has a size according to the electrode 10. For example, the air outlet 44 has a size equal to or larger than the size of the electrode 10. The air outlet 44 is provided with the wind shields 42. The wind shields 42 are arranged in a part of the air outlet 44. The wind shields 42 shield the hot air flowing through the duct 43. The wind shields 42 are provided in the duct 43 and partially shield the gas being blown from the air outlet 44 of the duct 43. Locations where the wind shields 42 are not formed correspond to openings 47 through which the hot air 30 passes. The openings 47 and the wind shields 42 are alternately arranged. The size of each opening 47 and the size of each wind shield 42 are substantially the same.

At locations immediately below the wind shields 42, the hot air 30 is not applied to the electrode layer 12. Only at locations immediately below the openings 47, the hot air 30 is applied to the electrode layer 12. Areas immediately below the wind shields 42 correspond to the second areas 22, and areas immediately below the openings 47 correspond to the first areas 21. In this manner, the wind shields 42 for preventing the hot air 30 from being applied to a part of the electrode layer 12 are provided in the drying device 40. The wind shields 42 are located at positions respectively corresponding to the first areas 21, and the openings 47 are located at positions respectively corresponding to the second areas 22. The wind shields 42 and the openings 47 have the same size and are alternately arranged.

Figure 7:
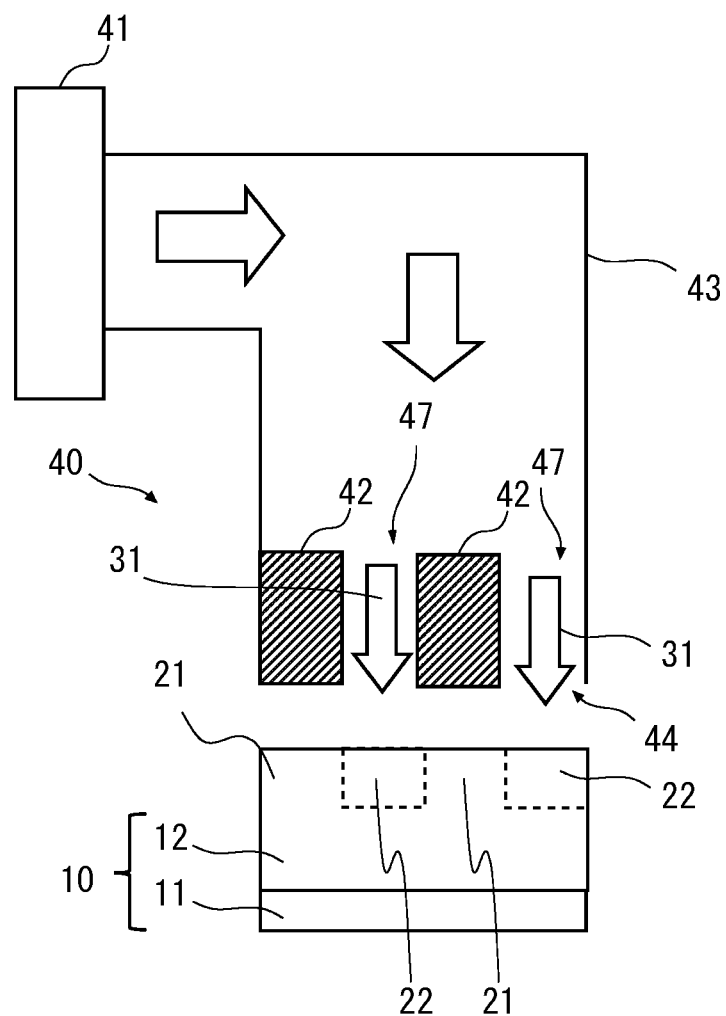
FIG. 7 is a diagram schematically showing the structure of the drying device in a second step.

In the first step, the structure shown in FIG. 6 is obtained. In the second step, as shown in FIG. 7, the positions of the wind shields 42 are changed. Specifically, the wind shields 42 are moved to the positions respectively corresponding to the openings 47 shown in FIG. 6. The position of the dried region is replaced by the position of the non-dried region in the electrode layer 12. Thus, the hot air 31 can be applied to the second areas 22 in the state where the hot air 31 is not applied to the first areas 21. Therefore, drying of the first areas 21 and drying of the second areas 22 can be alternately performed.

In the first step, the hot air 30 is blown toward the electrode layer 12 for a given period of time in the state shown in FIG. 6. Thus, the first step is completed. After the first step is completed, the positions of the wind shields 42 are moved, and the wind shields 42 are fixed at positions shown in FIG. 7. In the second step, the drying device 40 blows the hot air 31 toward the electrode layer 12 for a given period of time in the state shown in FIG. 7. This process is repeated a plurality of times, thereby volatilizing the solvent to form the electrode layer 12 into a desired thickness.

Thus, the segregation of the binder can be prevented even when the electrode layer is rapidly dried. Further, it is only necessary that the drying device 40 be provided with a mechanism for changing the positions of the wind shields 42, which makes it possible to prevent an increase in the size of the device and prevent the device from being complicated. Accordingly, rapid drying can be achieved with a simple structure. The drying device 40 according to this embodiment performs the drying process without moving the electrode 10 relative to the air outlet 44. That is, the electrode 10 can be dried in the state where the electrode 10 is fixed.

Instead of moving the wind shields 42, a plurality of drying devices 40 in which the wind shields 42 are arranged at different positions may be prepared. Specifically, a first drying device that blows the hot air 30 toward the first areas 21 and a second drying device that blows the hot air toward the second areas 22 are prepared. After one of the drying devices dries the electrode 10 for a given period of time, the electrode 10 may be moved to the other drying device. Further, the first drying device and the second drying device may alternately dry the electrode 10.

Figure 8:
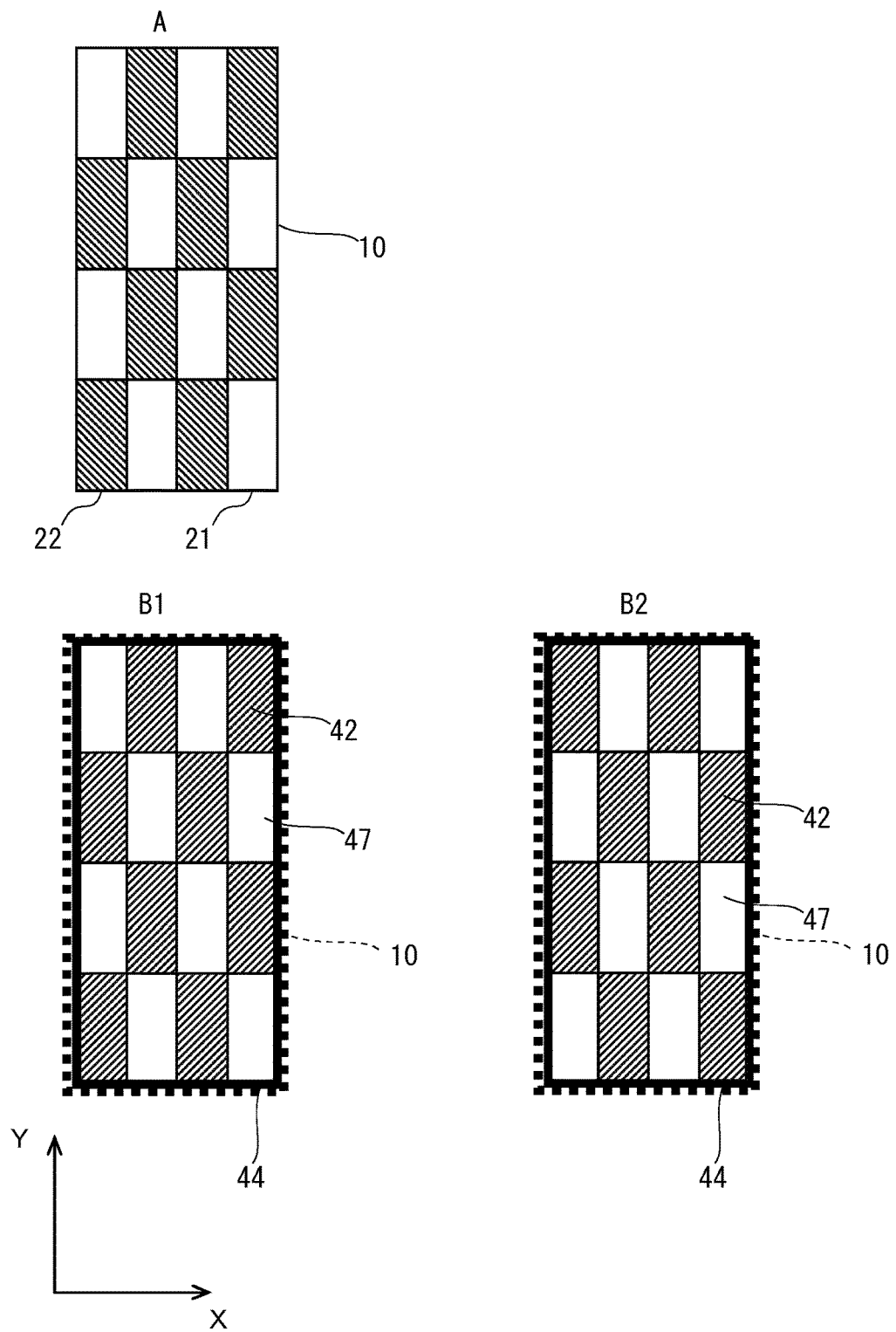
FIG. 8 is a plan view schematically showing the arrangement of wind shields and an electrode in a drying device according to Modified Example 2.

The positional relationship between the electrode 10 and the wind shields 42 will be described with reference to FIG. 8. FIG. 8 shows a plan view of the first areas 21 and the second areas 22 in the electrode 10, and also shows a plan view that schematically shows the arrangement of the wind shields 42 in the air outlet 44. The positions of the first areas 21 and the second areas 22 in the electrode 10 are shown in A of FIG. 8. The arrangement of the wind shields 42 in the first step is shown in B1 of FIG. 8, and the arrangement of the wind shields 42 in the second step is shown in B2 of FIG. 8. In B1 and B2 of FIG. 8, the position of the electrode 10 is indicated by a dotted rectangular frame. Specifically, the air outlet 44 in which the wind shields 42 are arranged as shown in B1 and B2 of FIG. 8 is disposed immediately above the electrode 10 that is arranged as shown in A of FIG. 8. For clarity of explanation, an XY orthogonal coordinate system is illustrated in FIG. 8.

As shown in B1 and B2 of FIG. 8, the wind shields 42 are arranged in a staggered manner in the air outlet 44. Specifically, the wind shields 42 are arranged at a predetermined pitch in an X-direction and a Y-direction. In the X-direction and the Y-direction, the openings 47 are arranged between the adjacent wind shields 42. In other words, in the X-direction and the Y-direction, the wind shields 42 are arranged between the adjacent openings 47. The hot air is blocked by the wind shields 42 and passes through the openings 47. As shown in FIG. 8, the air outlet 44 is divided into (4×4) areas. The wind shields 42 are respectively arranged in eight areas of the divided areas, and the remaining eight areas serve as the openings 47. In the XY plane, the wind shields 42 each have a rectangular shape. Accordingly, in the XY plane, the openings 47 each have a rectangular shape. The rectangular shape of each wind shield 42 and the rectangular shape of each opening 47 have substantially the same size.

In the first step, the wind shields 42 are arranged at the positions as shown in B1 of FIG. 8. Referring to A in FIG. 8, areas immediately below the openings 47 correspond to the first areas 21, and areas immediately below the wind shields 42 correspond to the second areas 22. In other words, in the X-direction and the Y-direction, the first areas 21 and the second areas 22 are alternately arranged. The number of the first areas 21 is the same as the number of the openings 47, and the number of the second areas 22 is the same as the number of the wind shields 42. Thus, the first areas 21 and the second areas 22 are arranged in a staggered manner.

In the second step, the wind shields 42 are moved to the positions as shown in B2 of FIG. 8. Specifically, the position of each wind shield 42 is moved in the +X-direction or −X-direction by the amount corresponding to one wind shield 42. The positions of the wind shields 42 are moved to the positions respectively corresponding to the openings 47 arranged in the first step. Accordingly, in the second step, areas immediately below the openings 47 correspond to the second areas and areas immediately below the wind shields 42 correspond to the first areas. In this manner, the positions of the wind shields 42 in the first step are set to be different from the positions of the wind shields 42 in the second step, thereby making it possible to execute the drying process as described above. This facilitates the execution of the first step and the second step, thereby achieving rapid drying.

In this case, the total area of the wind shields 42 and the total area of the openings 47 in the air outlet 44 are substantially the same. Accordingly, about a half of the area of the electrode 10 is occupied by the first areas 21, and the other half of the area of the electrode 10 is occupied by the second areas 22. That is, the area of each first area 21 and the area of each second area 22 are substantially the same in the electrode 10. The wind shields 42 having substantially the same size are arranged in a staggered manner. Thus, the areas to which the hot air is blown can be easily switched from the first areas 21 to the second areas 22. Further, the binder diffuses in four directions in the plane of the electrode, which leads to an increase in the number of directions in which the binder diffuses. Therefore, rapid drying can be achieved.

The arrangement of the wind shields 42 is not limited to the structure shown in FIG. 8, as a matter of course. For example, the area and shape of the first areas 21 may be different from those of the second areas 22. The electrode 10 is divided into a lattice shape, and the first areas 21 and the second areas 22 are alternately arranged in the divided areas. However, any structure other than this structure may be used. For example, the electrode 10 may be divided into stripes, and the first areas 21 and the second areas 22 may be alternately arranged in the divided areas. The plurality of wind shields 42 can be integrally formed. For example, the plurality of wind shields 42 can be integrally formed by using a wind shielding plate having a plurality of openings 47. The provision of the wind shielding plate in the air outlet 44 of the duct 43 makes it possible to blow hot air toward a desired area.

Modified Example 1 of Drying Device

Figure 9:
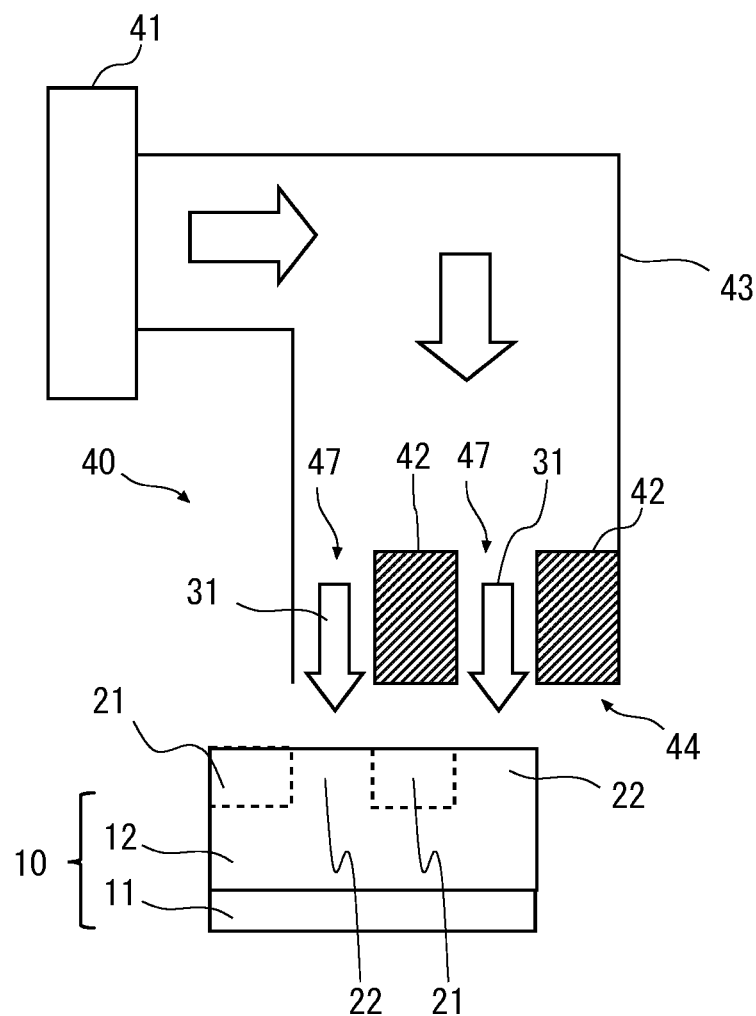
FIG. 9 is a diagram schematically showing a structure of a drying device according to Modified Example 1 in the second step.

In the above embodiment, the location where hot air is blown is changed by moving the wind shields 42. However, this embodiment is not limited to this. For example, the position of the electrode 10 relative to the drying device 40 may be shifted. Specifically, the electrode 10 is moved in the lateral direction from the state shown in FIG. 6. As a result, as shown in FIG. 9, areas immediately below the wind shields 42 correspond to the first areas 21 and areas immediately below the openings 47 correspond to the second areas. Thus, the hot air 31 is applied to the second areas 22 and the hot air 31 is not applied to the first areas 21.

For example, assume that the electrode 10 is in the state shown in FIG. 6. The position of the electrode 10 is fixed in the state shown in FIG. 6, and the hot air 30 is blown toward the first areas 21 for a given period of time. Thus, the first step is completed. After that, since the process proceeds to the second step, the electrode 10 is moved and brought into the state shown in FIG. 8. In the state shown in FIG. 8, the position of the electrode 10 is fixed and the hot air 31 is blown toward the second areas 22 for a given period of time. Thus, the second step is completed. After the second step is completed, the position of the electrode 10 is returned to the state shown in FIG. 6. Further, the first step and the second step are repeated to dry the electrode layer 12 until the electrode layer is formed into a desired thickness.

Thus, the advantageous effects as described above can be obtained. Further, it is only necessary to move the position of the electrode 10 between the first step and the second step, thereby eliminating the need for a mechanism to move the wind shields 42. Accordingly, the device can be further simplified. Instead of moving the electrode 10, the duct 43 or the like of the drying device 40 may be moved as a matter of course. That is, the position of the electrode 10 relative to the wind shields 42 may be changed.

Figure 10:
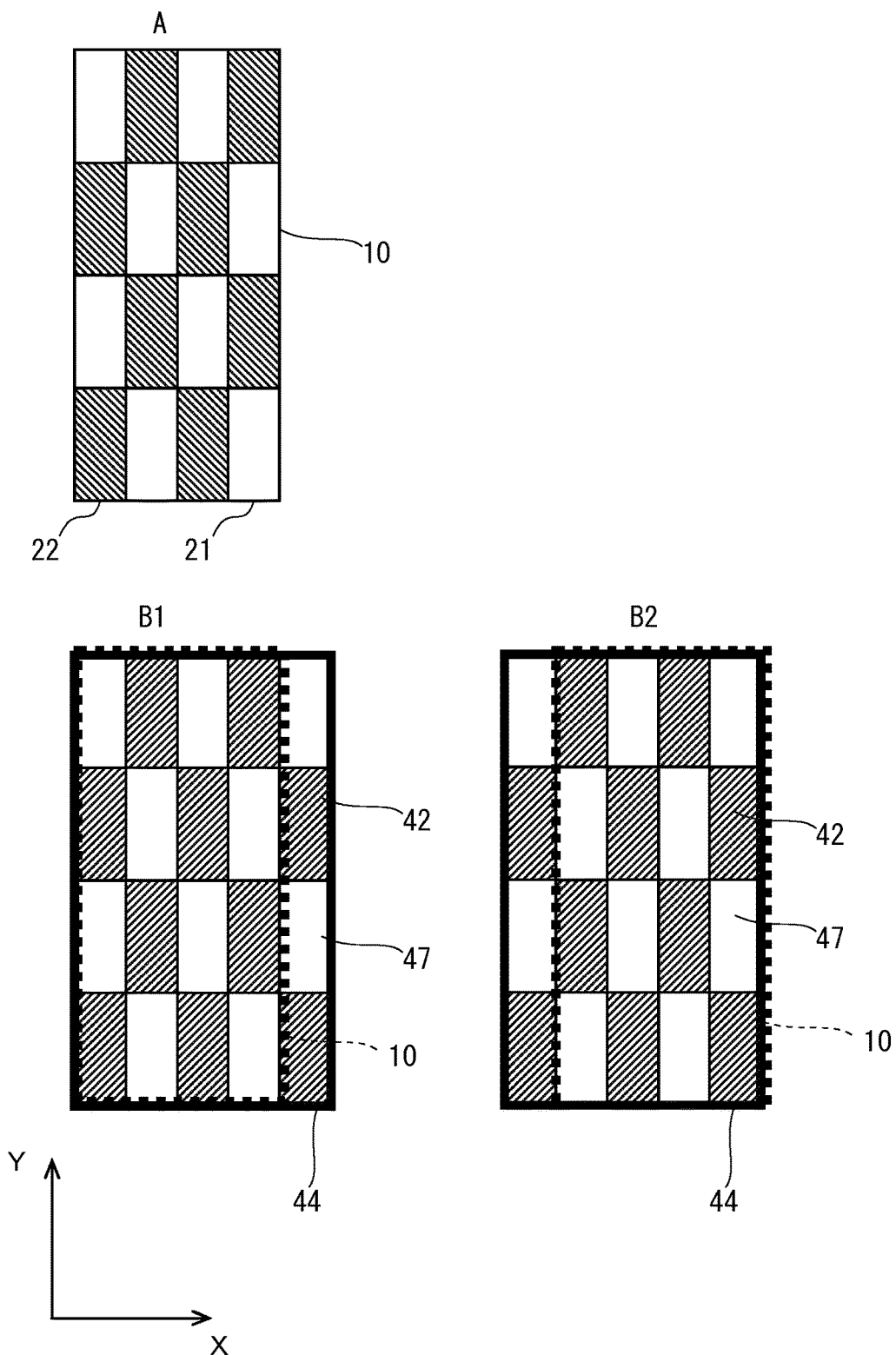
FIG. 10 is a plan view schematically showing the arrangement of first and second areas and wind shields.

The positional relationship between the electrode 10 and the wind shields 42 when the position of the electrode 10 is moved will be described with reference to FIG. 10. FIG. 10 is a plan view showing the first areas 21 and the second areas 22 in the electrode 10, and schematically shows the arrangement of the wind shields 42 in the air outlet 44. The positions of the first areas 21 and the second areas 22 in the electrode 10 are shown in A of FIG. 10. The positional relationship between the wind shields 42 and the electrode 10 in the first step is shown in B1 of FIG. 10, and the positional relationship between the wind shields 42 and the electrode 10 in the second step is shown in B2 of FIG. 10. For clarity of explanation, an XY orthogonal coordinate system is illustrated in FIG. 10. Explanations of the components identical to those shown in FIG. 8 will be omitted.

The air outlet 44 is divided into (5×4) areas, and the wind shields 42 are arranged in ten areas of the divided areas. The remaining 10 areas serve as the openings 47. The wind shields 42 and the openings 47 are arranged in a staggered manner. The shape of each wind shield 42 is similar to that shown in FIG. 8. The shape of each opening 47 is similar to that shown in FIG. 8.

In B1 and B2 of FIG. 10, the electrode 10 is schematically indicated by a dotted rectangular frame. The electrode 10 is smaller than the air outlet 44. Specifically, the air outlet 44 is larger than the electrode 10 by the amount corresponding to one row in the longitudinal direction in which the first and second areas are alternately arranged. The electrode 10 is disposed so as to overlap a part of the air outlet 43.

For example, in the first step, as indicated by a dotted rectangular frame shown in B1 of FIG. 10, the electrode 10 overlaps the area from the left end to the fourth row. In the second step, as indicated by a dotted rectangular frame shown in B2 of FIG. 10, the electrode 10 overlaps the area from the right end to the fourth row. In the first step, electrode 10 is fixed at the position shown in B1 of FIG. 10, and the drying device 40 blows the hot air 30 for a given period of time. In the second step, the drying device 40 blows the hot air 31 for a given period of time at the position shown in B2 of FIG. 10.

When the process shifts from the first step to the second step, the electrode 10 is moved in the +X-direction by the amount corresponding to one wind shield 42, thereby switching the structure shown in B1 of FIG. 10 to the structure shown in B2 of FIG. 10. The position where the hot air is blown in the first step and the position where the hot air is blown in the second step can be set to be different from each other. When the first step is performed after the second step, the electrode 10 is moved in the −X-direction by the amount corresponding to one wind shield 42. In this manner, the positions of the wind shields 42 relative to the electrode 10 are changed, thereby obtaining the same advantageous effects as those described above.

In the drying device 40 according to this embodiment and Modified Example 1 of this embodiment, the wind shields 42 are provided so that the hot air is blown toward a part of the electrode 10. The positions of the wind shields 42 relative to the electrode 10 are changed, thereby changing the position where the hot air is blown. The positions of the wind shields 42 within the duct 43, or the position of the electrode 10 relative to the air outlet 44, in the first step are set to be different from those in the second step. In each of the first step and the second step, the drying process is performed without moving the position of the electrode 10 relative to the air outlet 44. This facilitates the execution of the first step and the second step, thereby achieving rapid drying.

Modified Example 2 of Drying Device

Figure 11:
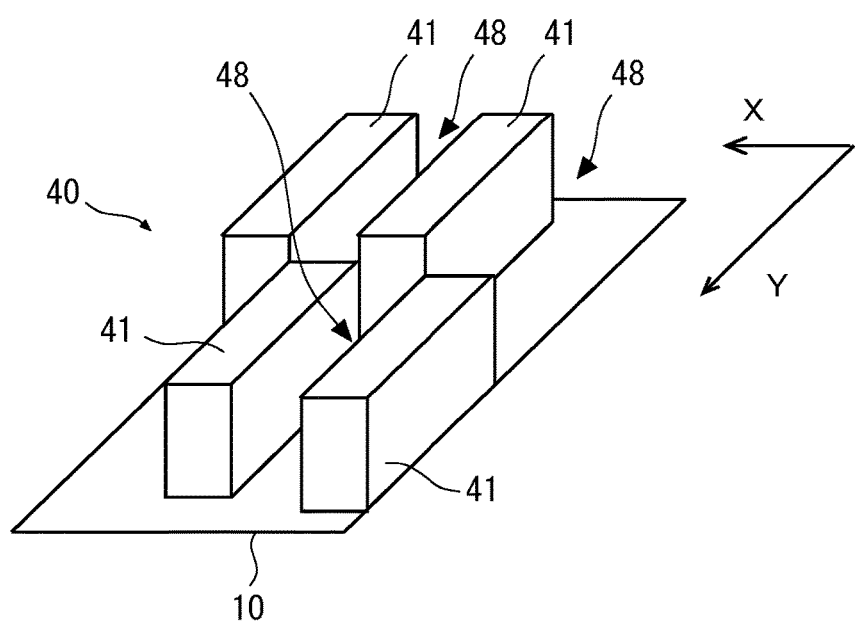
FIG. 11 is a perspective view schematically showing the structure of the drying device according to Modified Example 2.

FIGS. 6 to 10 illustrate the drying device which performs the drying process without moving the position of the electrode 10 relative to the air outlet 44. In Modified Example 2, the drying device 40 which performs the drying process while the electrode 10 is being transported is used. FIG. 11 is a perspective view schematically showing the structure of the drying device 40 according to Modified Example 2. Referring to FIG. 11, the drying device 40 blows hot air toward the electrode 10 while moving the electrode 10 in the Y-direction at a constant rate. In other words, the drying device 40 transports the electrode 10 in such a manner that the electrode 10 crosses the area where the hot air is blown.

The drying device 40 includes a plurality of hot air generators 41. Specifically, the plurality of hot air generators 41 are arranged on the electrode 10. The plurality of hot air generators 41 blow hot air having substantially the same temperature with substantially the same air flow. The plurality of hot air generators 41 are arranged in a staggered manner. In the transport direction (Y-direction), the hot air generators 41 are arranged at a predetermined pitch. Also in the direction orthogonal to the transport direction, i.e., in the X-direction, the hot air generators 41 are arranged at a predetermined pitch. A space 48 is provided between the adjacent hot air generators 41. On the electrode 10, the place where the hot air generators 41 are not provided is also the space 48. No hot air blows from the spaces 48 which are located adjacent to the hot air generators 41. Accordingly, areas immediately below the hot air generators 41 are dried regions and areas immediately below the spaces 48 are non-dried region.

Figure 12:
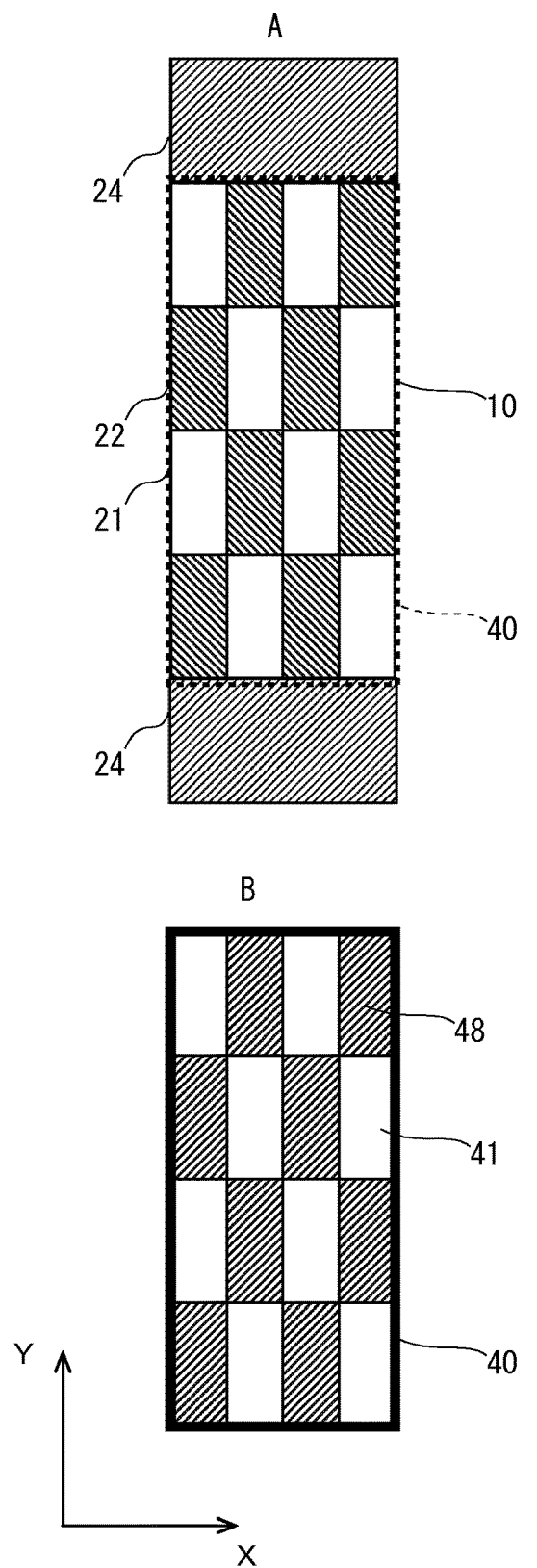
FIG. 12 is a plan view schematically showing the arrangement of wind shields and an electrode in the drying device according to Modified Example 2.

The positional relationship between the hot air generators 41 and the electrode 10 will be described with reference to FIG. 12. FIG. 12A is a plan view schematically showing the positional relationship between the first areas 21 and the second areas 22. Fig. A is a plan view showing the arrangement of the first areas 21 and the second areas 22 which are located immediately below the drying device 40. B of FIG. 12 is a plan view schematically showing the arrangement of the hot air generators 41 and the spaces 48. In FIG. 12, the length of the electrode 10 in the Y-direction is longer than the length of the drying device 40. Accordingly, the ends of the electrode 10 in the Y-direction project from the drying device 40. As shown in A of FIG. 12, the position of the drying device 40 in the Y-direction is indicated by a dotted rectangular frame. The length of the electrode 10 in the Y-direction may be equal to or shorter than the length of the drying device 40.

The hot air generators 41 and the spaces 48 are arranged in a staggered manner. In the X-direction and the Y-direction, each space 48 is provided between the adjacent hot air generators 41. Similarly, in the X-direction and the Y-direction, each hot air generator 41 is disposed between the adjacent spaces 48. Accordingly, the area where the hot air is blown from the corresponding hot air generator 41 and the area where no hot air is blown are alternately arranged. Thus, as shown in A of FIG. 12, the first areas 21 and the second areas 22 are arranged in a staggered manner. The portions of the electrode 10 that project from the drying device 40 and located immediately below the drying device 40 are areas where no hot air is blown, i.e., non-dried regions 24.

In the portions immediately below the drying device 40, the area where the hot air is blown and the area where no hot air is blown are alternately arranged. Since the electrode 10 is being transported, the area of the electrode 10 where the hot air is blown is gradually changed as the electrode is transported. For example, when the electrode 10 is moved in the Y-direction by the amount corresponding to one hot air generator 41, the position of each first area 21 is replaced by the position of each second area 22 on the electrode 10. When attention is focused on a specific area of the electrode 10, the hot air is blown toward the area for a period of time in which the area passes through the location immediately below each hot air generator 41, and after that, the hot air is not blown toward the area for a period of time in which the area passes through the location immediately below each space 48. Accordingly, when two or more hot air generators 41 are arranged in the Y-direction, the first step and the second step can be performed repeatedly. Also in the X-direction, two or more hot air generators 41 are arranged and each space 48 is disposed between the adjacent hot air generators 41. This allows the binder to be diffused not only in the Y-direction, but also in the X-direction. Thus, the same advantageous effects as those obtained when the electrode 10 is dried while the position of the electrode 10 is fixed can be obtained.

Since the solvent included in the electrode layer 12 is non-uniformly volatilized in the plane of the electrode, the binder concentration distribution is non-uniform. Accordingly, the binder concentration gradient increases, and thus the diffusion rate can be substantially increased. In this manner, the hot air is blown toward a part of the electrode 10 while the electrode 10 is being transported. The solvent can be partially volatilized, so that the same advantageous effects as those described above can be obtained. The first step and the second step can be easily executed, thereby achieving rapid drying.

While the hot air generators 41 are arranged in a staggered manner as shown in FIG. 11, the wind shields 42 may be arranged in a staggered manner as shown in FIGS. 6 to 10.

Specifically, the wind shields 42 may be arranged in a staggered manner in the air outlet 44 of the duct 43. For example, the wind shields 42 are arranged so that a plurality of openings 47 are formed on slits. The electrode 10 is transported so as to pass through the location immediately below the air outlet 44. Thus, the number of hot air generators 41 can be reduced to one.

In Modified Example 2, it is preferable that the hot air generators 41 blow the hot air toward the area of the electrode where the transport direction corresponds to the longitudinal direction. This makes it possible to dry the electrode so that the concentration distribution of the binder is made non-uniform in the plane of the electrode. For example, a slit whose longitudinal direction corresponds to the transport direction is formed in each hot air generator 41. Further, a plurality of slits are arranged in a staggered manner. When the hot air is blown through the slits, the period of time in which the hot air is blown toward a specific location on the electrode 10 increases. Specifically, the hot air is continuously blown toward a specific area on the electrode 10 during the period of time in which the specific area passes through one slit, while the hot air is not blown to the both ends of the specific area in the X-direction. In the area where the hot air is blown, the volatilization of the solvent proceeds and the concentration distribution of the binder becomes non-uniform. In this manner, the distribution of the hot air is made non-uniform on the surface of the electrode 10, thereby achieving rapid drying.

Second Embodiment (Drying Method)

Figure 13:
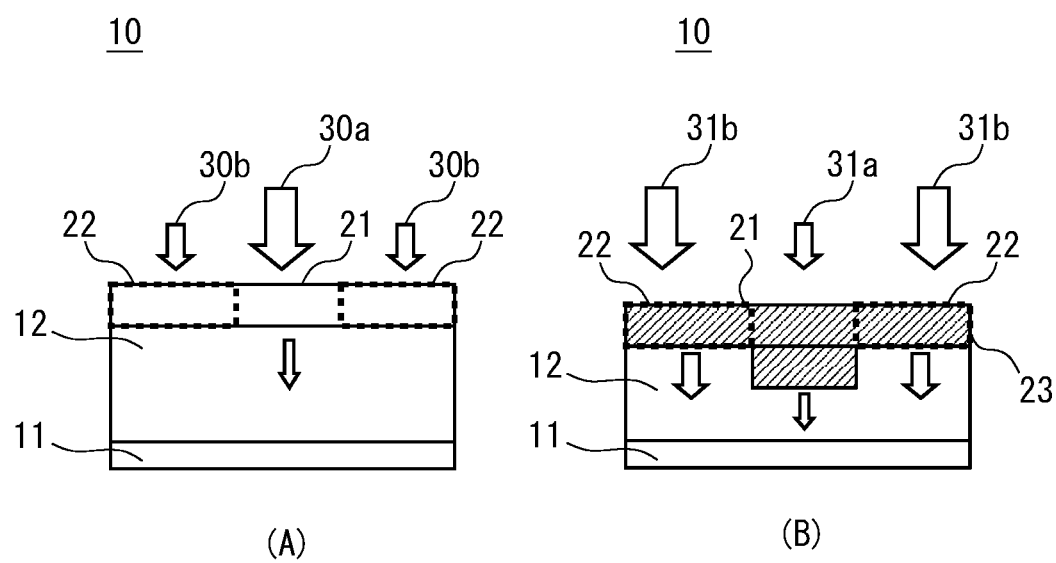
FIG. 13 is a process cross-sectional view for explaining a drying process according to a second embodiment.

A drying method according to this embodiment will be described with reference to FIG. 13. FIG. 13 is a process cross-sectional view showing the structure of the electrode 10. Explanations of the components of the second embodiment that are similar to those of the first embodiment will be omitted as appropriate.

In this embodiment, as shown in FIG. 13, hot air is blown toward the first areas 21 and the second areas 22 at the same time. That is, hot air is blown toward the entire electrode 10. The conditions for blowing the hot air toward the first areas 21 are different from the conditions for blowing the hot air toward the second areas 22. In other words, the air flow and temperature of the hot air are changed, instead of uniformly blowing hot air toward the electrode 10. Thus, the distribution of the volatilization rate in the plane of the electrode can be made non-uniform. That is, the drying device blows hot air so that a drying rate distribution is provided in the plane of the electrode 10.

For example, in the first step, as shown in A of FIG. 13, the air flow of hot air 30*a* that is blown toward the first areas 21 is set to be higher than the air flow of hot air 30*b* that is blown toward the second areas 22. Specifically, the wind velocity of the hot air 30*a* with respect to the first areas 21 is set to be higher than the wind velocity of the hot air 30*b* with respect to the second areas 22. Thus, the first areas 21 can be dried more rapidly than the second areas 22. In other words, the volatilization rate of the solvent from the first areas 21 is higher than the volatilization rate of the solvent from the second areas 22. Accordingly, the binder diffuses not only in the downward direction, but also in the lateral direction.

In the second step after the first step, the in-plane distribution of the air flow is adjusted. Specifically, the wind velocity of hot air 31*a* with respect to the first areas 21 and the wind velocity of hot air 31*b* with respect to the second areas 22 are changed. When the process shifts to the second step, the entire surface of the electrode is the high-concentration area 23. As shown in B of FIG. 13, the air flow of the hot air 31*b* which is blown toward the second areas 22 is set to be higher than the air flow of the hot air 31*a* which is blown toward the first areas 21. Specifically, the wind velocity of the hot air 30*a* with respect to the first areas 21 is set to be lower than the wind velocity of the hot air 30*b* with respect to the second areas 22.

With this structure, the solvent is non-uniformly volatilized, so that the binder concentration gradient in the thickness direction can be increased. Further, a binder concentration gradient can also be provided in the lateral direction, which leads to an increase in the number of directions in which the binder diffuses. Thus, the diffusion rate of the binder can be substantially increased. Accordingly, the same advantageous effects as those of the first embodiment can be obtained.

Note that in FIG. 13, the air flow of the hot air is adjusted so as to make the volatilization rate non-uniform. However, any method other than this method can be used. For example, the temperature of the hot air may be adjusted. For example, high-temperature hot air and low-temperature hot air may be blown at the same time toward the electrode 10. Alternatively, the direction of the hot air may be changed. For example, the hot air may be blown toward the electrode 10 from the lateral direction or an oblique direction.

The drying process including conditioning will be described below. First, the temperature and air flow of the hot air to be used are determined. Next, the area to be divided and the drying rate distribution are determined according to the size and the like of the electrode 10. In this manner, the drying conditions for the drying device are set.

Next, in the first step, as shown in A of FIG. 13, the hot air is blown toward the first areas 21 and the second areas 22 with different air flows so that the volatilization rate increases in the first areas 21. In the first step, the air flow of the hot air toward the first areas 21 is higher than the air flow of the hot air toward the second areas 22. The drying device blows the hot air having a non-uniform in-plane distribution toward the entire electrode 10. Thus, the solvent can be volatilized in the state where a drying rate distribution is provided.

In the second step, as shown in B of FIG. 13, the drying rate distribution is inverted, and the hot air is blown toward the first areas 21 and the second areas 22 with different air flows. In the second step, the air flow of the hot air toward the first areas 21 is lower than the air flow of the hot air toward the second areas 22. The drying device blows the hot air having a non-uniform in-plane distribution toward the entire electrode 10. Thus, the solvent can be volatilized in the state where a drying rate distribution is provided. In other words, the downward diffusion rate in the first areas 21 is different from that in the second areas 22. Further, since the diffusion of the solvent proceeds also in the lateral direction, the number of diffusion directions can be increased. Accordingly, the same advantageous effects as those of the first embodiment can be obtained.

(Drying Device)

Figure 14:
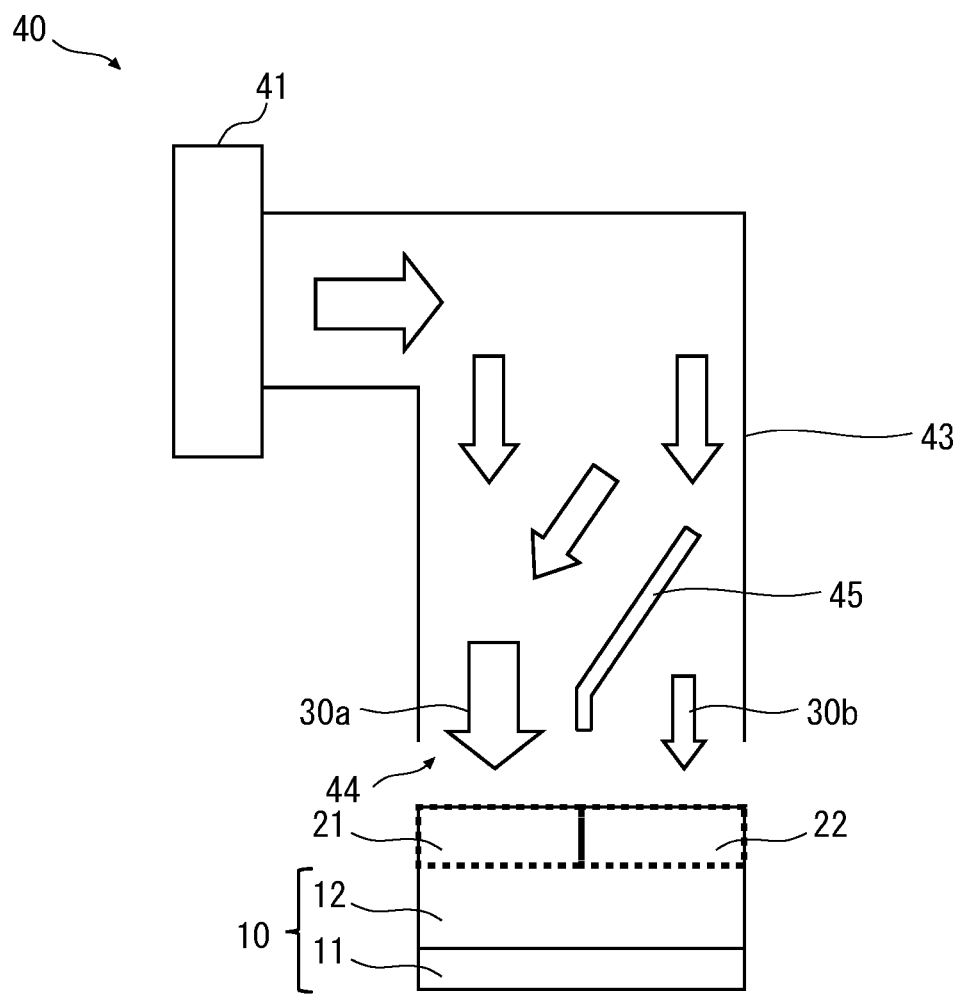
FIG. 14 is a diagram showing a structure of a drying device according to the second embodiment.

Next, the drying device for carrying out the drying method according to this embodiment will be described with reference to FIG. 14. FIG. 14 is a diagram schematically showing the structure of the drying device 40. Explanations of the components of the drying device 40 that are similar to those of the first embodiment will be omitted.

In the drying device 40 shown in FIG. 14, a partition plate 45 is provided within the duct 43. For example, the partition plate 45 is a bent plate and changes the direction of hot air flowing through the duct 43. The partition plate 45 is disposed obliquely with respect to the direction of the hot air flowing through the duct 43. Referring to FIG. 14, the partition plate is disposed obliquely from the upper right to the lower left. The hot air flows along the partition plate 45. The air flow of the hot air 30a increases on the right side of the partition plate 45, while the air flow of the hot air 30b decreases on the left side of the partition plate 45. In this manner, the partition plate 45 is provided within the duct 43 so that the distribution of the air flow of the hot air being blown from the air outlet 44 of the duct 43 is made non-uniform. The partition plate 45 provides an in-plane distribution of the wind velocity at the air outlet 44.

An end of the partition plate 45 on the side of the air outlet 44 is disposed along a boundary between the first area 21 and the second area 22. With this structure, the air flow of the hot air 30 being blown toward the first area 21 can be made different from the air flow of the hot air being blown toward the second area 22.

Further, when the process shifts from the first step to the second step, the angle of the partition plate 45 may be changed. Specifically, the partition plate 45 may be rotated so as to increase the air flow of the hot air being blown toward the second area 22. When the process shifts from the second step to the first step, the partition plate 34 is rotated in the opposite direction to thereby return the partition plate 45 to the original angle. This facilitates the adjustment of the air flow. The first step and the second step can be easily executed, thereby achieving rapid drying.

Even when the electrode is rapidly dried as described above, the segregation of the binder can be prevented. Further, since it is only necessary that the drying device 40 be provided with a mechanism for changing the direction of the partition plate 45, the structure of the device can be simplified. Accordingly, rapid drying can be achieved with a simple structure. The drying device 40 according to this embodiment performs the drying process without moving the electrode 10 with respect to the air outlet 44. In other words, the electrode 10 can be dried in the state where the electrode 10 is not moved.

Alternatively, the air flows in the first area 21 and the second area 22 may be changed by changing the position of the electrode 10 relative to the drying device 40. Specifically, in the first step and the second step, the position of the electrode 10 is moved so that the position of the electrode layer 12 relative to the air outlet 44 varies. Thus, the drying process shown in FIG. 13 can be executed. The first step and the second step can be executed with a simpler structure, thereby achieving rapid drying.

Modified Example 1 of Drying Device

Figure 15:
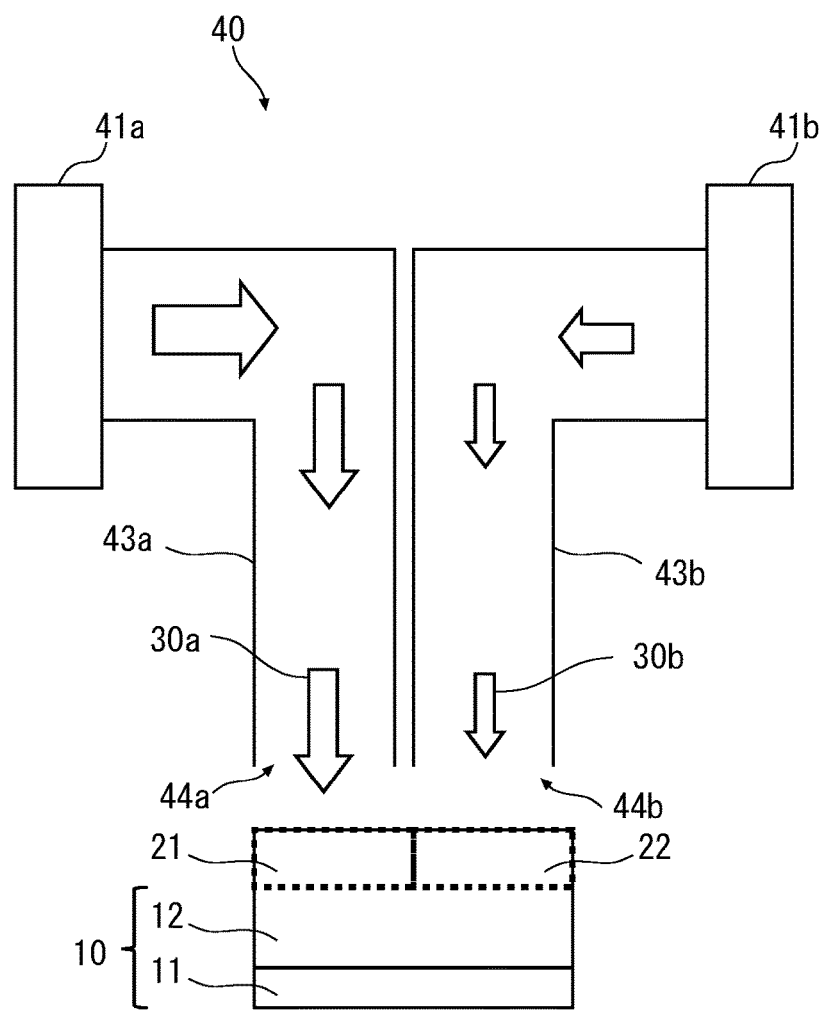
FIG. 15 is a diagram showing a structure of a drying device according to Modified Example 1 of the second embodiment.

The structure of the drying device 40 according to Modified Example 1 of the second embodiment will be described with reference to FIG. 15. FIG. 15 is a diagram schematically showing the structure of the drying device 40 according to Modified Example 1 of the second embodiment. Note that repeated explanation of the components described above is omitted as appropriate.

In Modified Example 1, the drying device 40 includes two hot air generators 41a and 41b. The hot air generators 41a and 41b can generate hot air separately. An air outlet 44a of a duct 43a which is attached to the hot air generator 41a is disposed immediately above the first area 21. The hot air generator 41a blows the hot air 30a toward the first area 21 through the duct 43a. Similarly, an air outlet 44b of a duct 43b which is attached to the hot air generator 41b is disposed immediately above the second area 22. The hot air generator 41b blows the hot air 30b toward the second area 22 through the duct 43b.

In the first step, the hot air generator 41a blows a strong wind toward the first area 21, and the hot air generator 41b blows a weak wind toward the second area 22. In other words, the air flow of the hot air 30a generated by the hot air generator 41a is higher than the air flow of the hot air 30b generated by the hot air generator 41b. In the second step, the hot air generator 41a blows a weak wind toward the first area 21 and the hot air generator 41b blows a strong wind toward the second area 22. In other words, the air flow of the hot air 30a generated by the hot air generator 41a is lower than the air flow of the hot air 30b generated by the hot air generator 41b. Thus, the drying process shown in FIG. 13 can be executed.

Instead of controlling the air flow of each of the hot air generators 41a and 41b, the position of the electrode 10 relative to the air outlet 44 may be changed. Specifically, the position of the electrode 10 is moved in such a manner that the position of the electrode 12 relative to the air outlets 44a and 44b in the first step is different from that in the second step. In the second step, the first area 21 is disposed immediately below the air outlet 44b, and the second area 22 is disposed immediately below the air outlet 44a. This structure facilitates the execution of the drying process shown in FIG. 13. The first step and the second step can be easily executed, thereby achieving rapid drying.

Modified Example 2 of Drying Device

Figure 16:
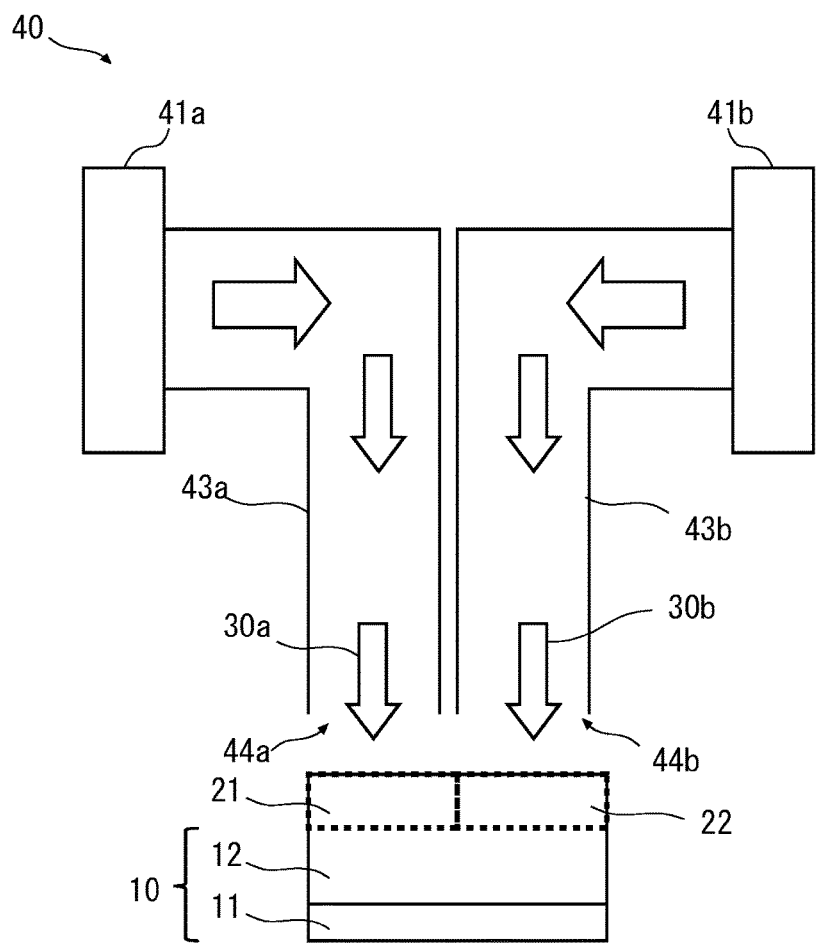
FIG. 16 is a diagram showing a structure of a drying device according to Modified Example 2 of the second embodiment.

The structure of the drying device 40 according to Modified Example 2 of the second embodiment will be described with reference to FIG. 16. FIG. 16 is a diagram schematically showing the structure of the drying device 40 according to Modified Example 2 of the second embodiment. Note that repeated explanation of the components described above is omitted as appropriate.

As in Modified Example 1, the drying device 40 includes two hot air generators 41a and 41b in Modified Example 2. The hot air generators 41a and 41b can generate hot air separately. Since the structure of the drying device 40 is similar to that of Modified Example 1, the detailed description thereof is omitted.

In the first step, the hot air generator 41a blows the high-temperature hot air 30a toward the first area 21, and the hot air generator 41b blows the low-temperature hot air 30b toward the second area 22. In other words, the temperature of the hot air 30a generated by the hot air generator 41a is higher than the temperature of the hot air 30b generated by the hot air generator 41b. In the second step, the hot air generator 41a blows the low-temperature hot air toward the first area 21, and the hot air generator 41b blows the high-temperature hot air toward the second area 22. In other words, the temperature of the hot air 30a generated by the hot air generator 41a is lower than the temperature of the hot air 30b generated by the hot air generator 41b. Thus, a non-uniform temperature distribution can be provided to the hot air on the surface of the electrode 10. The drying process shown in FIG. 13 can be executed. The first step and the second step can be easily executed, thereby achieving rapid drying.

Instead of controlling the temperature of each of the hot air generators 41a and 41b, the position of the electrode 10 relative to the air outlets 44a and 44b may be changed.

Further, heaters may be disposed in the ducts 43*a* and 43*b*, respectively, to control the temperature of the hot air.

Modified Example 3 of Drying Device

Figure 17:
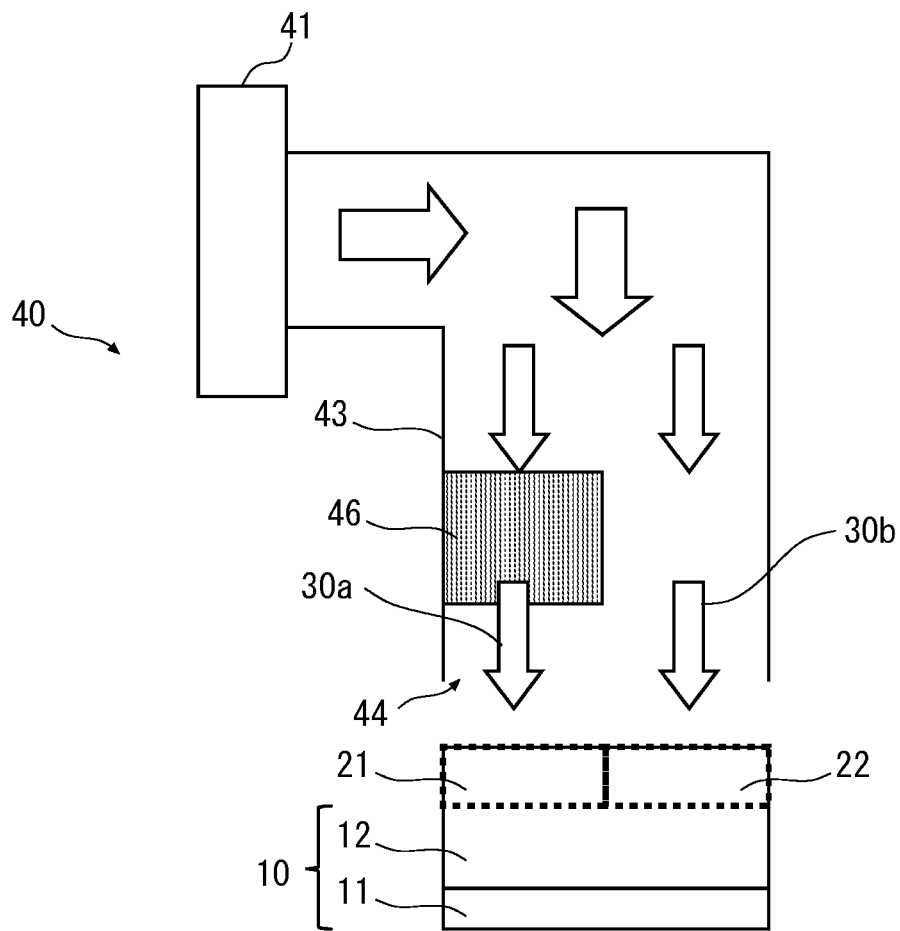
FIG. 17 is a diagram showing a structure of a drying device according to Modified Example 3 of the second embodiment.

The structure of the drying device 40 according to Modified Example 3 of this embodiment will be described with reference to FIG. 17. FIG. 17 is a diagram schematically showing the structure of the drying device 40 according to Modified Example 3 of the second embodiment. Note that repeated explanation of the components described above is omitted as appropriate.

Referring to FIG. 16, the drying device 40 includes one hot air generator 41. Further, a heater 46 is provided in the vicinity of the air outlet 44 of the duct 43. The heater 46 is provided in a part of the duct 43. Specifically, the heater 46 is attached to a part of the air outlet 44. The heater 46 is provided so as to be movable in the duct 43.

The heater 46 heats the hot air flowing through the duct 43. In other words, the hot air which passes through the heater 46 is further heated, while the hot air which does not pass through the heater 46 is not heated. Accordingly, the heater 46 which is disposed in a part of the duct can provide a non-uniform in-plane distribution to the temperature of the hot air. The hot air 30*a* being blown from the location immediately blow the heater 46 has a high temperature. The hot air 30*b* which has passed through the outside of the heater 46 has a low temperature. That is, a temperature difference is generated between the hot air 30*a* which has passed through the heater 46 and the hot air 30*b* which has not passed through the heater 46.

In the first step, the heater 46 is disposed immediately above the first area 21. Thus, the drying device 40 blows the high-temperature hot air 30*a* toward the first area 21 and blows the low-temperature hot air 30*b* toward the second area 22. That is, the temperature of the hot air 30*a* being blown toward the first area 21 is higher than the temperature of the hot air 30*b* being blown toward the second area 22. After the first step is completed, the heater 46 is moved.

In the second step, the drying device 40 blows the low-temperature hot air toward the first area 21 and blows the high-temperature hot air toward the second area 22. That is, the temperature of the hot air being blown toward the first area 21 is lower than the temperature of the hot air being blown toward the second area 22. Thus, the drying process shown in FIG. 13 can be executed. The first step and the second step can be easily executed, thereby achieving rapid drying.

With this structure, even when the electrode is rapidly dried, the segregation of the binder can be prevented. Further, it is only necessary that the drying device 40 be provided with a mechanism for changing the position of the heater 46, which makes it possible to prevent an increase in the size of the device and prevent the device from being complicated. Thus, rapid drying can be achieved with a simple structure. The drying device 40 according to this embodiment performs the drying process without moving the electrode 10 with respect to the air outlet 44. In other words, the hot air is blown in the state where the electrode 10 is not moved. Instead of moving the heater 46, the position of the electrode 10 relative to the air outlet 44 may be changed. This eliminates the need for a mechanism for moving the heater 46.

In the drying device 40 according to the second embodiment and Modified Examples 1 to 3 of the second embodiment, the first areas 21 and the second areas 22 may be arranged in a staggered manner. Further, the total area of the first areas 21 may be substantially the same as the total area of the second areas 22. Furthermore, the first step and the second step, the hot air may be blown for substantially the same period of time.

Modified Example 4 of Drying Device

Figure 18:
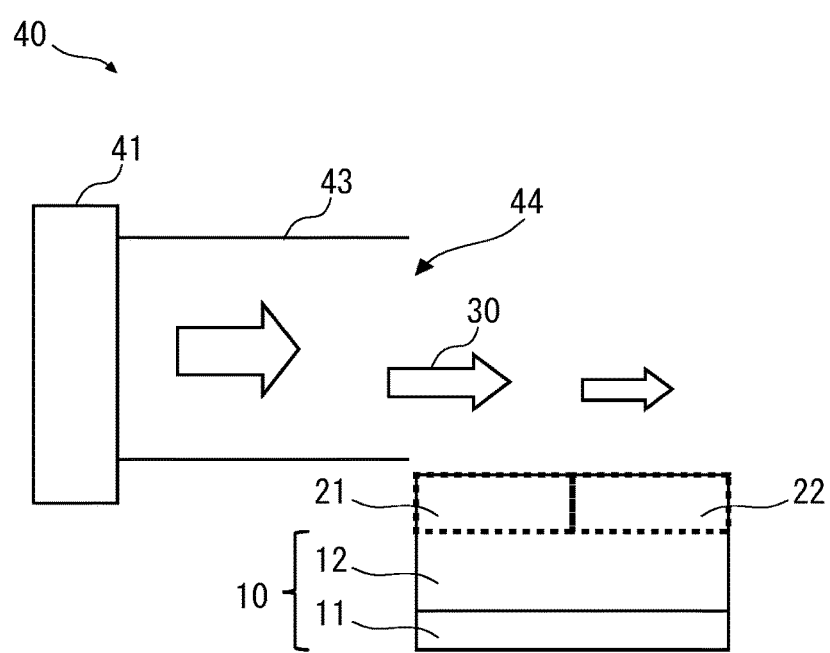
FIG. 18 is a diagram showing a structure of a drying device according to Modified Example 4 of the second embodiment.

The structure of the drying device 40 according to Modified Example 4 of this embodiment will be described with reference to FIG. 18. FIG. 18 is a diagram schematically showing the structure of the drying device 40 according to Modified Example 4 of the second embodiment. Note that repeated explanation of the components described above is omitted as appropriate.

In Modified Example 4, the duct 43 is disposed along the lateral direction. Specifically, the air outlet 44 is perpendicular to the surface of the electrode 10 and is disposed in the vicinity of an end of the electrode 10. The hot air being blown from the air outlet 44 passes above the electrode 10 in the lateral direction. That is, the hot air is blown toward the surface of the electrode layer 12 from the lateral direction. In this case, the air outlet 44 of the duct 43 is disposed at one end of the electrode 10. The hot air 30 is blown along the surface of the electrode 10. Referring to FIG. 18, the hot air 30 flows from the left side to the right side. In other words, the hot air 30 is blown toward the second area 22 from the first area 21.

Accordingly, in the first area 21 near the air outlet 44, the hot air 30 is a strong wind having a high temperature and a low humidity. In the second area 22 far from the air outlet 44, the hot air 30 is a weak wind having a low temperature and a high humidity. Accordingly, the solvent is non-uniformly volatilized from the electrode layer 12. A binder concentration gradient can be provided in the lateral direction. That is, the electrode can be dried non-uniformly in the plane of the electrode.

In the state shown in FIG. 18, the hot air 30 is blown for a given period of time and the electrode 10 is then rotated by 180 degrees. Alternatively, the position and direction of the duct 43 are changed so that the duct 43 is disposed at the other end of the electrode 10. As a result, the second area 22 is located close to the air outlet 44. The hot air is blown toward the first area 21 from the second area 22 for a given period of time.

With this structure, the solvent can be dried non-uniformly. The binder concentration gradient in the thickness direction can be increased and the binder can be diffused in the lateral direction. Accordingly, the same advantageous effects as those described above can be obtained. The first step and the second step can be easily executed, thereby achieving rapid drying. Note that in Modified Example 4, a plurality of ducts 43 may be arranged around the electrode 10. In other words, the air outlets 44 of the plurality of ducts 43 are arranged around the electrode 10. Blowing of the hot air from the air outlets 44 may be switched.

Note that in the second embodiment, the structures shown in FIGS. 14 to 18 may be combined as appropriate. For example, Modified Example 2 shown in FIG. 15 may be combined with Modified Example 3 shown in FIG. 16. In this case, in the first step, the hot air generator 41*a* generates a high-temperature strong wind and the hot air generator 41*b* generates a low-temperature weak wind. Further, in the second step, the hot air generator 41*b* generates a high-temperature strong wind and the hot air generator 41*a* generates a low-temperature weak wind. With this structure, more rapid drying can be achieved. Any other combinations of the modified examples can be used as appropriate. For example, a plurality of ducts 43 are prepared, and the hot air generator 40 shown in FIG. 18 can be combined with any one of the hot air generators shown in FIGS. 14 to 17. In the second embodiment, the drying process may be performed while the electrode 10 is being transported.

Further, the first embodiment and the second embodiment can be combined. For example, in the first and second embodiments, the first step and the second step are repeated. Some processes in the first and second steps, which are repeated a plurality of times, are performed in the manner as illustrated in the first embodiment, and the other processes are performed in the manner as illustrated in the second embodiment. Also with this structure, the same advantageous effects as those described above can be obtained. For example, as shown in FIGS. 15 and 16, the first embodiment and the second embodiment can be combined using a plurality of hot air generators 41. Specifically, when the drying process is carried out by the method illustrated in the first embodiment, the operation of some of the hot air generator 41 is stopped. On the other hand, when the drying process is carried out by the method illustrated in the second embodiment, all the hot air generators 41 are operated under different drying conditions. Thus, the drying methods according to the first and second embodiments can be easily combined.

In the above description, it is assumed that the position of the electrode 10 set in the first step is moved to a different position in the second step. However, instead of moving the electrode 10, the duct 43 or the hot air generator 41 may be moved. That is, it is only necessary that the position of the electrode 10 relative to the air outlet 44 or the hot air generator 41 be changed. Further, the air flow and the like can be adjusted using a plurality of hot air generators 41.

In the first and second embodiments, the electrode 10 is divided into two areas, i.e., the first area and the second area, and hot air is blown toward the first area and the second area alternately. That is, a set of the first step and the second step, or a plurality of sets of the first step and the second step are executed. Further, the electrode 10 may be divided into three or more areas, and hot air may be sequentially blown toward the three or more areas. Furthermore, in the first and second embodiments, the first area and the second area have the same area. However, the first area may have a larger or smaller area than that of the second area. Although the drying period in the first step is the same as the drying period in the second step, the drying period in the first step may be longer or shorter than the drying period in the second step.

The drying method described above is suitable for a battery manufacturing method. The electrode layer 12 is formed on the current collector foil 11. After that, the electrode layer 12 is dried using the above-described drying method. With this method, rapid drying can be achieved and the productivity of batteries can be improved. The electrode layer 12 in which the binder concentration distribution is uniform can be formed into a desired thickness. Consequently, batteries having excellent characteristics can be manufactured at a high productivity.

This application is based upon and claims the benefit of priority from Japanese patent application No. 2013-146059, filed on Jul. 12, 2013, the disclosure of which is incorporated herein in its entirety by reference.

INDUSTRIAL APPLICABILITY

The present invention is applicable to a drying process for an electrode layer of a battery.

REFERENCE SIGNS LIST

10 ELECTRODE
11 CURRENT COLLECTOR FOIL
12 ELECTRODE LAYER
21 FIRST AREA
22 SECOND AREA
23 HIGH-CONCENTRATION AREA
30 HOT AIR
31 HOT AIR
40 DRYING DEVICE
41 HOT AIR GENERATOR
42 WIND SHIELD
43 DUCT
44 AIR OUTLET
45 PARTITION PLATE
46 HEATER
47 OPENING
48 SPACE

The invention claimed is:

1. A drying method that dries an electrode layer including a binder and a solvent, the drying method comprising:
   a first step of blowing a gas onto a first area of the electrode layer to volatilize the solvent, the electrode layer being coated on a base material; and
   a second step of blowing a gas onto a second area of the electrode layer to volatilize the solvent, the second area being located around the first area,
   wherein the first area and the second area are arranged in a staggered manner,
   in the first step, by non-uniformly volatilizing the solvent, the binder diffuses such that a concentration of the binder in the first area is higher than a concentration of the binder in the second area on a surface of the electrode layer, and
   in the second step, by non-uniformly volatilizing the solvent, the binder diffuses such that the concentration of the binder in the first area is lower than the concentration of the binder in the second area on the surface of the electrode layer.

2. A drying method that dries an electrode layer including a binder and a solvent, the drying method comprising:
   a first step of blowing a gas onto a first area of the electrode layer to volatilize the solvent, the electrode layer being coated on a base material; and
   a second step of blowing a gas onto a second area of the electrode layer to volatilize the solvent, the second area being located around the first area,
   wherein the first step and the second step are performed alternately and repeatedly,
   in the first step, a second gas is blown toward the second area so that a volatilization rate of the solvent in the first area is higher than a volatilization rate of the solvent in the second area,
   in the second step, a second gas is blown toward the first area so that the volatilization rate of the solvent in the second area is higher than the volatilization rate of the solvent in the first area,
   in the first step, by non-uniformly volatilizing the solvent, the binder diffuses such that a concentration of the binder in the first area is higher than a concentration of the binder in the second area on a surface of the electrode layer, and
   in the second step, by non-uniformly volatilizing the solvent, the binder diffuses such that the concentration of the binder in the first area is lower than the concentration of the binder in the second area on the surface of the electrode layer.

3. A drying method that dries an electrode layer including a binder and a solvent, the drying method comprising:
   a first step of blowing a gas onto a first area of the electrode layer to volatilize the solvent, the electrode layer being coated on a base material; and
   a second step of blowing a gas onto a second area of the electrode layer to volatilize the solvent, the second area being located around the first area,
   wherein the first step and the second step are performed alternately and repeatedly,
   in the first step, a second gas to be blown toward the second area has a temperature lower than that of a gas to be blown toward the first area,
   in the second step, a second gas to be blown toward the first area has a temperature lower than that of the gas to be blown toward the second area,
   in the first step, by non-uniformly volatilizing the solvent, the binder diffuses such that a concentration of the binder in the first area is higher than a concentration of the binder in the second area on a surface of the electrode layer, and
   in the second step, by non-uniformly volatilizing the solvent, the binder diffuses such that the concentration of the binder in the first area is lower than the concentration of the binder in the second area on the surface of the electrode layer.

4. The drying method according to claim 2, wherein
   in the first step, an air flow of the second gas to be blown toward the second area is smaller than an air flow of a gas to be blown toward the first area, and
   in the second step, the air flow of the second gas to be blown toward the first area is smaller than the air flow of the gas to be blown toward the second area.

5. The drying method according to claim 2, wherein
   in the first step, the gas is blown toward the second area from the first area, and
   in the second step, the gas is blown toward the first area from the second area.

6. The drying method according to claim 1, wherein
   in the first step, the solvent is volatilized by blowing a gas onto the first area without applying the gas to the second area, and
   in the second step, the solvent is volatilized by blowing a gas onto the second area without applying the gas to the first area.

7. The drying method according to claim 1, wherein in each of the first and second steps, a gas is blown without moving a position of the electrode layer relative to an air outlet for the gas.

8. The drying method according to claim 1, wherein in each of the first and second steps, a gas is blown while a position of the electrode layer relative to an air outlet for the gas is moved.

9. An electrode manufacturing method comprising the steps of:
   coating an electrode layer on a base material, the electrode layer including a binder and a solvent; and
   drying the electrode layer by a drying method according to claim 1.

10. An electrode manufacturing method comprising the steps of:
    coating an electrode layer on a base material, the electrode layer including a binder and a solvent; and
    drying the electrode layer by a drying method according to claim 2.

11. An electrode manufacturing method comprising the steps of:
    coating an electrode layer on a base material, the electrode layer including a binder and a solvent; and
    drying the electrode layer by a drying method according to claim 3.

* * * * *